(12) United States Patent
Chen

(10) Patent No.: US 12,425,702 B2
(45) Date of Patent: Sep. 23, 2025

(54) MULTIMEDIA CONTENT SHARING METHOD AND APPARATUS, DEVICE, AND MEDIUM

(71) Applicant: TENCENT TECHNOLOGY (SHENZHEN) COMPANY LIMITED, Shenzhen (CN)

(72) Inventor: Zi Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 61 days.

(21) Appl. No.: 18/323,533

(22) Filed: May 25, 2023

(65) Prior Publication Data

US 2023/0300429 A1 Sep. 21, 2023

Related U.S. Application Data

(63) Continuation of application No. PCT/CN2022/125950, filed on Oct. 18, 2022.

(30) Foreign Application Priority Data

Dec. 10, 2021 (CN) .......................... 202111505069.6

(51) Int. Cl.
*H04N 21/845* (2011.01)
*H04N 21/2743* (2011.01)
*H04N 21/472* (2011.01)

(52) U.S. Cl.
CPC ..... *H04N 21/8456* (2013.01); *H04N 21/2743* (2013.01); *H04N 21/47217* (2013.01)

(58) Field of Classification Search
CPC ........... H04N 21/4788; H04N 21/8456; H04N 21/2743; H04N 21/472; H04N 21/47217; G06F 16/7844; G06F 16/738; G06F 16/74; G06F 16/743; G06F 16/783; G06F 3/04817; G06F 3/0482; G06F 3/04842
(Continued)

(56) References Cited

U.S. PATENT DOCUMENTS

2008/0313541 A1  12/2008  Shafton et al.
2019/0172166 A1*  6/2019  Evans .............. H04N 21/41407
(Continued)

FOREIGN PATENT DOCUMENTS

| CN | 106713987 A | 5/2017 |
|---|---|---|
| CN | 109905780 A | 6/2019 |
| CN | 111934985 A | 11/2020 |

OTHER PUBLICATIONS

The World Intellectual Property Organization (WIPO) International Search Report for PCT/CN2022/125950 Jan. 11, 2023 5 Pages (including translation).

*Primary Examiner* — Thai Q Tran
*Assistant Examiner* — Nienru Yang
(74) *Attorney, Agent, or Firm* — Anova Law Group, PLLC

(57) ABSTRACT

A multimedia content sharing method includes: displaying a target video; receiving a clip selection operation on the target video, the clip selection operation being configured to select a target video clip in the target video; and generating a multimedia sharing image based on the clip selection operation, the multimedia sharing image representing sharing information about at least one of a clip picture, a clip line content, and a clip audio of the target video clip.

20 Claims, 12 Drawing Sheets

(58) Field of Classification Search
USPC .......................................................... 386/241
See application file for complete search history.

(56) References Cited

U.S. PATENT DOCUMENTS

2020/0058289 A1\* 2/2020 Gabryjelski ............ G06F 40/58
2021/0258658 A1\* 8/2021 Geng ............... H04N 21/47217

\* cited by examiner

MULTIMEDIA CONTENT SHARING METHOD AND APPARATUS, DEVICE, AND MEDIUM

CROSS-REFERENCES TO RELATED APPLICATIONS

This application is a continuation application of PCT Patent Application No. PCT/CN2022/125950, filed on Oct. 18, 2022, which claims priority to Chinese Patent Application No. 202111505069.6 on Dec. 10, 2021 and entitled "MULTIMEDIA CONTENT SHARING METHOD AND APPARATUS, DEVICE, MEDIUM AND PROGRAM PRODUCT", the entire contents of both of which are incorporated herein by reference.

FIELD OF THE TECHNOLOGY

Embodiments of the present disclosure relate to the field of computer technologies, and in particular, to a multimedia content sharing method and apparatus, a device, a medium and a program product.

BACKGROUND OF THE DISCLOSURE

With the development of computer technologies, mobile phones, tablets and other terminals are becoming more and more popular. When encountering favorite line audios during watching a video, a user may want to save or share the audio corresponding to the lines with friends.

In related technologies, in the video playback process, when encountering favorite line audios, the user records pictures corresponding to the lines with the help of a screen recording function of the terminal, or records a line text and the corresponding time by extracting or other ways.

However, the line sharing process above is more cumbersome, and the efficiency of human-computer interaction is low.

SUMMARY

Embodiments of the present disclosure provide a multimedia content sharing method and apparatus, a device, a medium and a program product, which can obtain favorite a line audio more conveniently, simplify the audio acquisition process, and improve the efficiency of human-computer interaction. The technical solutions are as follows:

In an aspect, provided is a multimedia content sharing method, executed by a computer device, the method including: displaying a target video; receiving a clip selection operation on the target video, the clip selection operation being configured to select a target video clip in the target video; and generating, based on the clip selection operation, a multimedia sharing image corresponding to the target video clip, the multimedia sharing image representing sharing information about at least one of a clip picture, a clip line content, and a clip audio of the target video clip.

In another aspect, provided is another multimedia content sharing method, executed by a computer device, the method including: receiving a multimedia sharing image from a target account, the multimedia sharing image being a content shared after the target account selects a target video clip in a target video; receiving a trigger operation on the multimedia sharing image; and playing, based on the trigger operation, a clip audio in the multimedia sharing image.

In another aspect, provided is a multimedia content sharing apparatus, including: an interface display module, configured to display a target video; an operation receiving module, configured to receive a clip selection operation on the target video, the clip selection operation being configured to select a target video clip in the target video; and a content generating module, configured to generate, based on the clip selection operation, a multimedia sharing image corresponding to the target video clip, the multimedia sharing image representing sharing information about at least one of a clip picture, a clip line content, and a clip audio of the target video clip.

In another aspect, provided is a multimedia content sharing apparatus, including: a content receiving module, configured to receive a multimedia sharing image from a target account, the multimedia sharing image being a content shared after the target account selects a target video clip in a target video; an operation receiving module, configured to receive a trigger operation on the multimedia sharing image; and an audio playback module, configured to play, based on the trigger operation, a clip audio in the multimedia sharing image.

In another aspect, provided is a computer device, including at least one processor and at least one memory, the at least one memory storing at least one instruction, at least one program, and a code set or an instruction set, and the at least one instruction, the at least one program, the code set or the instruction set being loaded and executed by the at least one processor to implement the multimedia content sharing method according to any one of the embodiments of the present disclosure.

In another aspect, provided is a non-transitory computer-readable storage medium, the storage medium storing at least one instruction, at least one program, and a code set or an instruction set, and the at least one instruction, the at least one program, and the code set or the instruction set being loaded and executed by at least one processor to implement the multimedia content sharing method according to any one of the embodiments of the present disclosure.

Beneficial effects brought by the technical solutions in the embodiments of the present disclosure at least include the following: the clip selection operation on the target video is received, a target video clip having a clip line content is selected from the target video, and the target video clip also includes a clip audio that matches the clip line content, and a multimedia sharing image is generated after the target video is selected. The multimedia sharing image is shared, so as to share the clip line content and the clip audio. Through the method above, favorite line audio is obtained more conveniently during watching videos, the audio acquisition process is simplified, and the efficiency of human-computer interaction is improved. Moreover, the user may also share the obtained clip line content with the clip audio, so that a receiving party may more quickly know the clip line content and clip audio corresponding to the target video clip.

DESCRIPTION OF EMBODIMENTS

An embodiment of the present disclosure provides a multimedia content sharing method, so that the user can obtain a favorite line audio more conveniently, simplify the audio acquisition process, and improve the efficiency of human-computer interaction. The multimedia content sharing method provided in the present disclosure, when applied, may include any of the following scenarios in the following examples.

1. Intercept a Line Audio for Saving

Schematically, in a playback process of a target video (including both a playback state and a pause state), a user sometimes encounters favorite line audio in the target video and wants to save the line audio, such as: taking the line audio as a unique ring tone or wake-up alarm, etc., and performing a clip selection operation on a target video in a playback interface through the multimedia content sharing method, so as to obtain a target video clip in the target video. The target video clip includes a clip line content and a clip audio matching the clip line content, the user may download the clip audio to a mobile phone in the form of an audio file, and may also play the clip audio according to the user's preferences, or set it as the ring tone or wake-up alarm, etc.

Through the method above, the line audio may be obtained in time, and the efficiency of human-computer interaction is efficiently improved.

2. Share the Line Audio to Friends

Schematically, in the playback process of the target video (including both the playback state and the pause state), the user sometimes encounters interesting line audio in the target video and wants to share the line audio to friends or social platforms to improve interaction with others through the video. The clip selection operation is performed on the target video in the playback interface through the multimedia content sharing method, so as to obtain a target video clip in the target video. The target video clip includes a clip line content and a clip audio matching the clip line content, the user may transmit the clip audio to friends in the form of an audio file, and may transmit the clip line content to friends in the form of a text or attached to pictures, and may also share a clip audio combined with the clip line content for multimedia content sharing and share it to a selected social platform, etc.

The application scene is only an illustrative example, and the multimedia content sharing method provided in this embodiment may also be applied to other scenes, which is not limited in the embodiment of the present disclosure.

Figure 1:
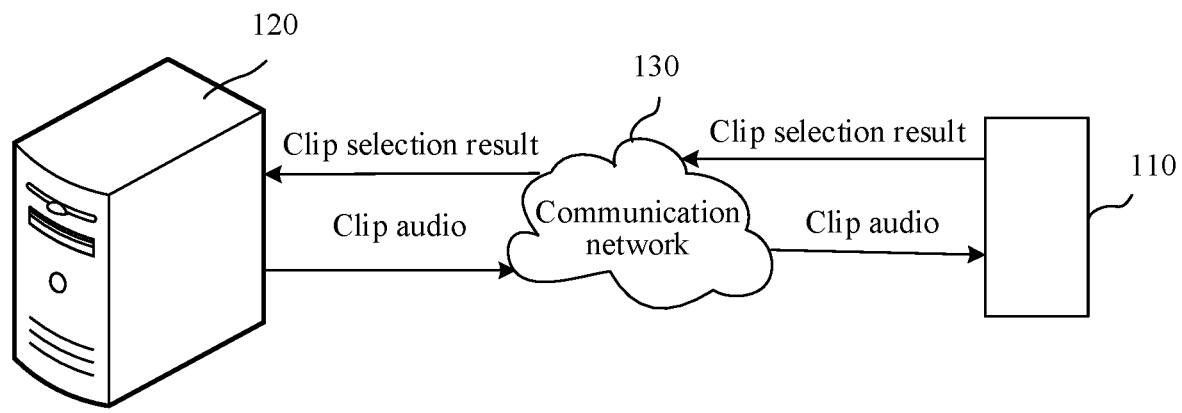
FIG. 1 is a schematic diagram of an environment for multimedia content sharing according to an exemplary embodiment of the present disclosure.

Secondly, an implement environment involved in the embodiment of the present disclosure is described. The multimedia content sharing method provided in the embodiment of the present disclosure may be implemented through a terminal, or through a terminal and a server together. Schematically, with reference to FIG. 1, the implement environment relates to a terminal 110 and a server 120. The terminal 110 and the server 120 are connected through a communication network 130.

In some embodiments, the terminal 110 is configured to transmit a selection result to the server 120. In some embodiments, an application program having a video playback function is installed in the terminal 110.

In this embodiment, in a process of playing a target video through the application program having the video playback function (a playback state or a pause state), the terminal 110 transmits a clip selection result to the server 120, so as to indicate the selected target video clip. The target video clip correspondingly has a clip audio and a clip line content, and the clip audio matches the clip line content, for example, the clip line content is a line content from an $A^{th}$ line to an $F^{th}$ line, and the clip audio is an audio content corresponding to the $A^{th}$ line to the $F^{th}$ line. Illustration is made by taking the server 120 implementing multimedia content sharing according to the clip selection result as an example.

In some embodiments, after receiving the clip selection result from the terminal 110, the server 120 determines, based on the clip selection result, a target video clip, and a clip audio and a clip line content corresponding to the target video clip. Then the server 120 transmits the clip audio and the clip line content corresponding to the target video clip to the terminal 110 through the communication network 130, and the terminal 110 may perform playback, saving and other operations on the clip audio, and may also perform multimedia content sharing on the clip audio combined with the clip line content, such as: sharing the clip audio to friends or social platforms, etc.

The terminal includes, but is not limited to, a mobile terminal such as a mobile phone, a tablet computer, a portable laptop computer, an intelligent voice interaction device, a smart home appliances, and a vehicle-mounted terminal, and may also be realized as a desktop computer. The server may be an independent physical server, a server cluster or distributed system composed of a plurality of physical servers, and a cloud server providing basic cloud computing services.

In some embodiments, the server may also be implemented as a node in a blockchain system.

Figure 2:
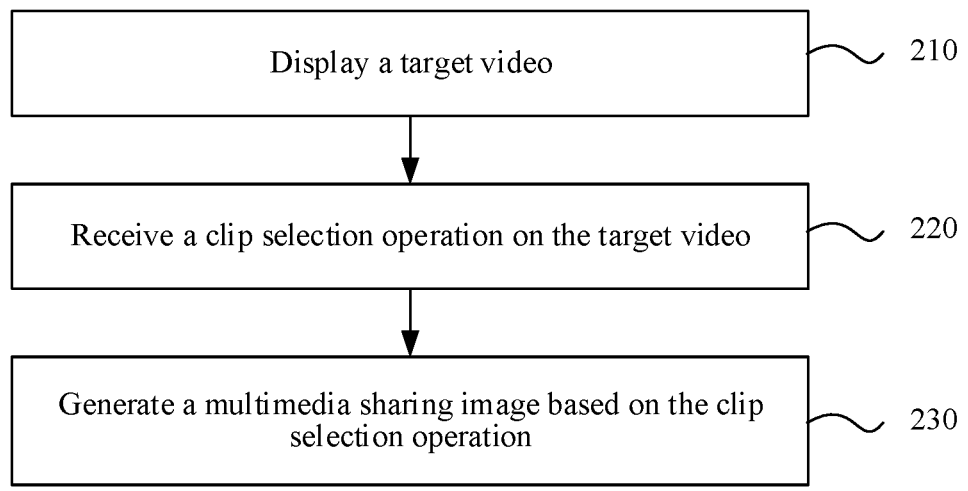
FIG. 2 is a flowchart of a multimedia content sharing method according to an exemplary embodiment of the present disclosure.

In combination with the term introduction above and the application scenes, the following describes a multimedia content sharing method provided by the present disclosure. Taking the method being applied to the terminal as an example, as shown in FIG. 2, the method includes the following steps:

Step 210: Display a target video.

In some embodiments, the target video is displayed in a playback interface. The playback interface displays a video frame of the target video. In some embodiments, a process of displaying the target video includes or does not include a line content. In response to that the process of displaying the target video includes a line content, the target video is configured with a line file, and the line content is displayed in a process of playing the target video according to a display timestamp of a line in the line file. Alternatively, in the process of playing the target video, voice recognition is performed on an audio of the target video, to obtain a line content corresponding to the target video.

In some embodiments, the target video includes at least one of the following videos:

1. film and television dramas, documentaries, variety shows, animations, etc. broadcast on video software or websites; 2. short video videos of shorter durations that are played and pushed through other media channels such as short video platforms; and 3. videos recorded by oneself or others. Schematically, any video consisting of continuous image pictures and having a certain duration may be used as the target video, which is not limited in the embodiment of the present disclosure.

The video playback interface generally refers to an interface capable of playing videos, including at least one of a video playback interface in a webpage, a video playback interface in an application program, and a video playback interface configured by a mobile terminal.

The line content includes statement information narrated by a character in the video, and the line content corresponding to the target video is statement information narrated by a character in the target video, including lines narrated by a main character and lines narrated by secondary characters. It may be either Chinese line content or foreign language line content. Schematically, in response to that the target video is a documentary, a line content corresponding to the target video includes both a dialogue within a picture and between characters, and a monologue within the picture and narrated by the character alone.

In some embodiments, the line content also includes a voice-over in the target video. The voice-over refers to the situation where there is no character but there is sound in the target video, that is: a sound source is not directly emitted by a person or thing in the picture, but by the dubbing, interpretation, etc. of a character outside the picture, such as: auxiliary description on the video by a chorus character. The above is only an illustrative example, which is not limited in the embodiment of the present disclosure.

Step 220: Receive a clip selection operation on the target video.

In some embodiments, a clip selection operation on the target video is received in a playback interface of the target video, or a clip selection operation on the target video is received in other specified interfaces, which is not limited in this embodiment.

The target video is continuous picture information composed of a plurality of video frames, where at least one video frame constitutes a video clip, and the video clip belongs to the target video and is part of the video content of the target video. Schematically, a video clip is the video frame in the target video from a first moment to a second moment. The clip selection operation is configured to obtain part of the video clip from the target video.

In one embodiment, the clip selection operation is configured to select a target video clip in the target video, the target video clip corresponds to the clip audio and clip line content, and the clip audio matches the clip line content. Schematically, the clip selection operation includes at least one of the following methods.

1. The Clip Selection Operation is a Statement Selection Operation on the Line Content.

In some embodiments, receiving a statement selection operation on a line content of the target video as the clip selection operation; and determining a video clip corresponding to at least one line statement as the target video clip.

The statement selection operation is configured to select the at least one line statement. In some embodiments, the line content of the target video is displayed in the playback interface of the target video in the form of a subtitle. Schematically, the subtitle is a text content of the target video configured before playback. For example, the target video is an episode of a domestic film and television drama, in which the line content corresponding to the film and television drama is a Chinese subtitle displayed at the bottom of the screen. Alternatively, the target video is an English documentary, in which the line content corresponding to the documentary is a bilingual subtitle (a Chinese subtitle and an English subtitle) displayed on the right side of the screen.

Schematically, the line content of the target video is generated based on an audio content of the target video. For example, the target video is an episode of a domestic film and television drama, in which the domestic film and television drama is a video without subtitles. In the video playback process, the terminal playing the video converts an audio of the target video into text in real time based on a function of converting voice to text, and displays the text in the playback interface. Alternatively, the target video is an English documentary without subtitles. In the video playback process, the terminal playing the video converts an audio of the target video into text in real time based on a function of converting voice to text, and displays the text in the playback interface, where the displayed text may be converted into different languages according to the user's selection.

In one embodiment, the statement selection operation includes at least one of the following operation methods.

1. Take a Long-Press Operation as the Statement Selection Operation.

In some embodiments, a long-press operation on the line content of the target video is received; a line selection interface is displayed based on the long-press operation; and a selection operation on the at least one line statement is received in the line selection interface.

The line selection interface includes a line statement in the line content.

Schematically, long-press operation refers to an operation of pressing for a preset required duration. In response to receiving that the long-press operation duration of the line content of the playback interface reaches or exceeds the preset duration, the long-press operation on the line content is realized. For example, a preset duration of the long-press operation is set to 2 seconds, analysis is performed by taking Movie A as the target video. Movie A is configured with a bilingual subtitle (a Chinese subtitle and an English subtitle), the bilingual subtitle is used as the line content corresponding to the target video. In the playback process of Movie A, the long-press operation is performed on the Chinese subtitle displayed on the playback interface at a certain moment. In response to that the duration of the long-press operation reaches a preset duration of 2 seconds, the long-press operation on the Chinese subtitle is regarded as the statement selection operation. Alternatively, in response to that Movie A is in the pause state, the long-press operation is performed on the English subtitle displayed on the playback interface at the pause moment, and in response to that the duration of the long-press operation reaches a preset duration of 2 seconds, the long-press operation on the English subtitle is regarded as the statement selection operation.

Schematically, the line content that may trigger the statement selection operation through the long-press operation is configured by the user, for example, The user sets the Chinese subtitle as the line content that may trigger the statement selection operation (the line content that may trigger the statement selection operation is not set for the English subtitle), that is, in response to receiving that the long-press operation on the Chinese subtitle reaches a preset duration, the long-press operation on the Chinese subtitle is regarded as the statement selection operation. In response to receiving that the long-press operation of English subtitle reaches the preset duration, it may prompt the user "Cannot select the line content, please enter the settings to set", or it may be regarded as triggering the long-press operation on the playback interface to perform double-speed playback, etc. The above is only an illustrative example, which is not limited in the embodiment of the present disclosure.

In some embodiments, The line content is a plurality of line statements corresponding to the target video, that is, the line statement corresponding to the target video constitutes the line content of the target video, and the long-press operation on the line content includes the long-press operation on a certain line statement, and the line selection interface displayed based on the long-press operation includes at least one line statement.

In some embodiments, After the long-press operation on the line content of the target video is received, the line selection interface is displayed, in which the line selection interface may be presented in the form of a floating layer (the line selection interface is superimposed on the playback interface) or by jumping to another interface. Schematically, after the long-press operation on a certain line statement of the target video is received, it jumps to the line selection interface. The line selection interface includes a plurality of line statements corresponding to the target video, for example, The long-press operation is realized by triggering an $m^{th}$ line statement in the target video, and in the line selection interface displayed based on the long-press operation, the $m^{th}$ line statement of the target video is used as a first statement, and line statements behind the $m^{th}$ line are displayed (e.g., displaying six line statements). Alternatively, the $m^{th}$ line statement of the target video is used as a middle statement, and at least one line statement in front of the $m^{th}$ line statement and at least one line statement behind it (e.g., displaying two line statements in front of the $m^{th}$ line statement and three line statements behind it). Alternatively, the line selection interface is a slidable interface (e.g., sliding up and down or sliding left or right), where m is a positive integer.

In one embodiment, a specified range of line contents including the clip line content is displayed on the multimedia sharing image, where the clip line content is highlighted. In some embodiments, During display of the clip line content, the specified range of line contents including the clip line content is displayed. Schematically, the $m^{th}$ line statement is the selected line content, and during display of the clip line content, it is stipulated to display three line contents, such as displaying an (m−1)th line statement, an $m^{th}$ line statement, and an (m+1)th line statement, where the $m^{th}$ line statement is distinguished from other line statements in bold, highlighting, color, etc. (e.g., highlighting the $m^{th}$ line statement).

Schematically, after the user performs a long-press operation on the $m^{th}$ line statement in the target video, it jumps to the line selection interface. In some embodiments, The $m^{th}$ line statement is in a selected state by default, and the user may cancel the selection of the $m^{th}$ line statement, and may also select other line statements corresponding to the target video, for example, While retaining the selected state of the $m^{th}$ line statement, by sliding the line selection interface, the user selects a third line statement in front of the $m^{th}$ line statement and s first line statement behind the $m^{th}$ line statement, etc. by clicking.

2. Take a Double-Click Operation as the Statement Selection Operation.

In some embodiments, a double-click operation on the line content of the target video is received; a line selection interface is displayed based on the double-click operation; and a selection operation on the at least one line statement is received in the line selection interface.

The line selection interface includes a line statement in the line content.

Schematically, the double-click operation is used as a statement selection operation, and in response to receiving the double-click operation on any line statement on the playback interface, the line selection interface is displayed. For example, the target video is played in the playback interface, and after the double-click is performed on an $n^{th}$ line statement in the target video, the playback interface jumps to the line selection interface. In some embodiments, In response to that the user watches the target video in a playback interface of a mobile phone in a landscape mode, the user may select to display the line selection interface in the playback interface in a landscape display mode, or select to display the line selection interface in the playback interface in a portrait display mode.

Based on the presentation of the line selection interface, the user selects at least one line statement on the line selection interface to realize the selection operation on the line content.

The above is only an illustrative example, which is not limited in the embodiment of the present disclosure.

Figure 3:
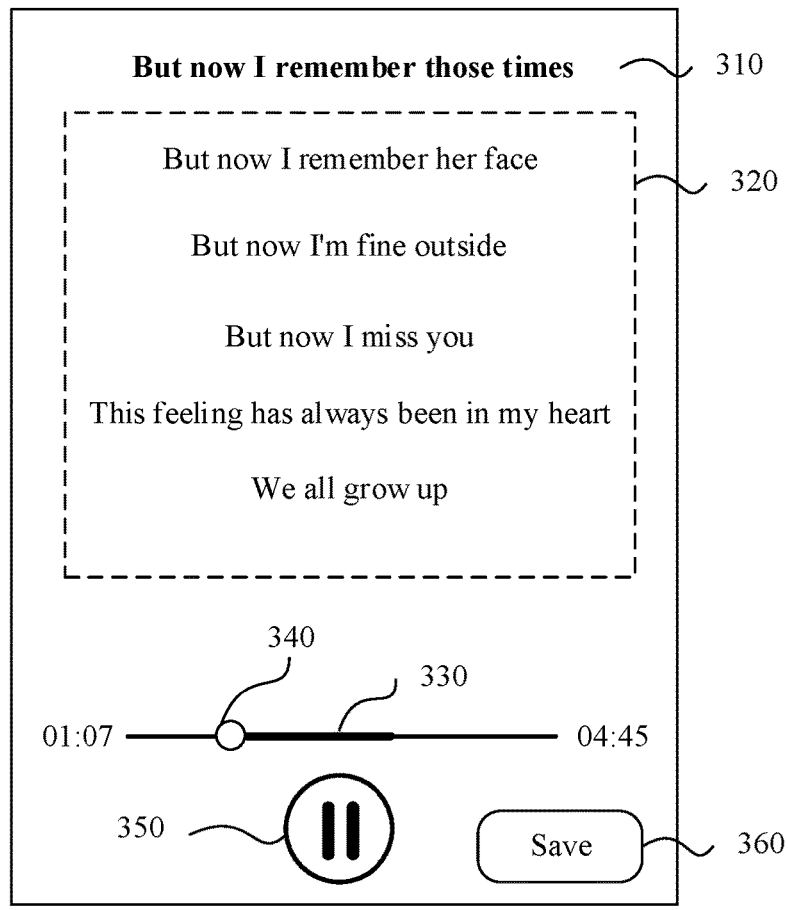
FIG. 3 is an interface diagram of a multimedia content sharing method according to an exemplary embodiment of the present disclosure.

In one embodiment, FIG. 3 illustrates a schematic diagram of a line selection interface. A bold line 310 indicates that the line statement is a line corresponding to the selected time point. A regular line 320 indicates that the line statement is not selected. In some embodiments, the user may select the line statement by clicking a line statement corresponding to the regular line 320, and the selected line becomes bold. A bold timeline 330 indicates an audio portion (a target video clip portion) selected by the user. A timeline mark 340 indicates a start timestamp of the target video clip. A pause control 350 indicates that a pause or playback operation is performed on the target video. A save control 360 indicates to save an operation process on the line selection, i.e., the line selection process is completed.

In some embodiments, after the user selects the line statement, a line in a bold state is presented, and the line in the bold state is presented in a regular state when it is selected the next time (i.e., the display effect is not bold), for example, whether the line is selected is indicated by presenting a regular state or a bold state.

In some embodiments, after the line selection interface is jumped to, the user may select a line content corresponding to the target video. Schematically, the line selection interface includes at least one line statement corresponding to the target video, and the selection operation includes at least one of the following methods: (1) the user selects the line contents one by one by clicking on the line statements; (2) the user performs a selection operation on the line content by clicking a box in front of the line statement; and (3) the user performs multiple selections on the line statement by long pressing and sliding.

In some embodiments, after the line content is selected, the selected line content may be distinguished by color, bold, and shading, etc. For example, the selected line content is displayed in green in the line selection interface, and the unselected line content is displayed in gray in the line selection interface. Alternatively, the selected line content is displayed in a bold state in the line selection interface, and the unselected line content is displayed in a normal state (not bolded) in the line selection interface. Alternatively, the selected line content has yellow shading in the line selection interface, and the unselected line content has no shading in the line selection interface, etc.

2. The Clip Selection Operation is a Trigger Operation on the Timeline.

In one embodiment, a first trigger operation on a timeline of the target video is received, the first trigger operation being configured to determine a start timestamp of the target video clip. A second trigger operation on the timeline of the target video is received, the second trigger operation being configured to determine a termination timestamp of the target video clip. The target video clip is determined based on the start timestamp and the termination timestamp.

The timeline is to connect one or more aspects of events in series in a chronological order to form a relatively complete recording system, and then present to the user in the form of a picture, a text, and a video, etc. Schematically, the timeline of the target video is obtained by connecting the video frames of the target video in series in a chronological order, such as a progress bar of the target video. For the determined target video, the duration is fixed, and the timeline is also fixed.

The first trigger operation and the second trigger operation are control operations on the timeline, including an operation on the timeline and an operation on functional controls outside the timeline (for example, the function control is used in controlling the timeline). In some embodiments, The first trigger operation and the second trigger operation may be the same operation or different operations. For example, the first trigger operation and the second trigger operation are click operations, or the first trigger operation is a click operation, and the second trigger operation is a double-click operation, etc. Schematically, the first trigger operation indicates a trigger operation on a function control on a playback interface, where the function control is used in performing a clip selection operation on the timeline. Before the function control is triggered, a click operation is performed on a certain point on the timeline to indicate that the target video jumps to a video frame corresponding to the point, for example, Before the function control is triggered, a click operation is performed on "03:22" on the timeline corresponding to the target video to indicate that the target video jumps to a video frame corresponding to the target video at 3 minutes and 22 seconds. After the function control is triggered (the first trigger operation), the target video is in a pause state, and a timestamp corresponding to the target video in the pause state is determined as the start timestamp of the target video clip. Alternatively, after the function control is triggered (the first trigger operation), the target video is still in a playback state, and the timestamp corresponding to the target video at a moment of triggering the function control is determined as the start timestamp of the target video clip.

In some embodiments, after the first trigger operation, the user performs a second trigger operation on the timeline, and the second trigger operation does not trigger a jumping function corresponding to the timeline (i.e., jumping to a timestamp corresponding to the second trigger operation). Schematically, the first trigger operation is a function control trigger operation, and the second trigger operation is a click operation. After the start timestamp of the target video clip is determined based on the first trigger operation, a click operation is performed on a certain point on the timeline corresponding to the target video, and a timestamp corresponding to the point is used as the termination timestamp of the target video clip. For example, after the start timestamp of the target video clip is determined based on the first trigger operation, a click operation is performed on "05:27" on the timeline corresponding to the target video, and 5 minutes and 27 seconds is used as the termination timestamp of the target video clip.

Based on the determination of the start timestamp and the termination timestamp, a video clip within the start timestamp and the termination timestamp is used as the target video clip, and the target video clip is a part of the target video. In some embodiments, in response to that the start timestamp is a start moment of the target video, the termination timestamp is a termination moment of the target video, and the target video clip is the target video. The above is only an illustrative example, which is not limited in the embodiment of the present disclosure.

3. The Clip Selection Operation is a Framing Operation on the Timeline.

In one embodiment, a framing operation on the timeline of the target video is received as the clip selection operation. Based on a target time period corresponding to the framing operation on the timeline, a video clip within the target time period is determined as the video clip.

The framing operation indicates a selection operation on the timeline corresponding to the target video, and the timeline is partially selected through the framing operation. Schematically, a long-press operation is performed on the timeline of the target video, to trigger the framing operation, a timestamp corresponding to the long-press operation is used as a start point of the framing operation, and the user realizes the framing operation on the timeline by sliding on the playback interface. In some embodiments, in response to that the user leaves the playback interface at a certain timestamp, or the user leaves a valid range of the framing operation at a certain timestamp, it is regarded as a framing end operation, and a timestamp corresponding to the framing end operation is used as an end point of the framing operation. Schematically, based on the start point and the end point of the framing operation, a framing range of the timeline is determined, a time period corresponding to the timeline in the framing range is determined as the target time period, and a video clip in the target time period is determined as the target video clip, so as to realize a process of obtaining the corresponding target video clip.

The target video clip corresponds to a clip audio and a clip line content. The target video clip belongs to the target video. The clip audio is an audio content intercepted from the target video and corresponding to the target video clip. The clip line content is a line content obtained from the target video and corresponding to the target video clip. Schematically, analysis is performed by taking Movie X as the target video. Based on the foregoing method, a target video clip x is obtained from the target video X, the target video clip x has a clip line content, the clip line content includes 6 line statements narrated by a leading actor in Movie X, and the target video clip x also includes a clip audio matching the 6 line statements, and the clip audio is audio information of the leading actor in Movie X when narrating the 6 line statements. In some embodiments, the clip audio matching clip line content means that a clip line content may be obtained by performing speech-to-text conversion on the clip audio. Alternatively, the clip audio content may be obtained by performing text-to-speech conversion on the clip line content. Alternatively, under the premise of considering character information corresponding to the line statement, the clip audio content may be obtained by performing text-to-speech conversion on the clip line content. The above is only an illustrative example, which is not limited in the embodiment of the present disclosure.

In some embodiments, a duration of the clip audio is the same as a duration of the target video clip, for example, the target video clip is a video clip with a duration of 10 seconds obtained from the target video, and a clip audio duration corresponding to the target video clip is also 10 seconds, including both a line audio part corresponding to the clip line content and a background audio part other than the line audio part. The line audio part indicates an audio corresponding to the clip line content, and the background audio part indicates an audio other than the clip line content. In some embodiments, the user may select to obtain the line audio part as a clip audio, i.e., taking the line audio part related to the clip line content as the clip audio, and not taking the background audio part that is not related to the clip line content as the clip audio, etc.

In some embodiments, during the clip selection operation, the target video includes at least the following states.

1. The Target Video is in a Playback State.

Schematically, during the clip selection operation, the target video is in the playback state, that is, the playback progress of the target video is still in progress. For example, the target video is Movie A, and during the playback of Movie A, a clip selection operation is performed on Movie A.

2. The Target Video is in a Pause State.

Schematically, during the clip selection operation, the target video is in the pause state, that is, the playback progress of the target video is paused on a certain video frame. For example, the target video is Movie A, and Movie A pauses on a video frame corresponding to 32 minutes and 47 seconds, and the clip selection operation is performed on Movie A.

Step 230: Generate a multimedia sharing image based on the clip selection operation.

In some embodiments, a multimedia sharing image is generated after the target video clip is selected, where the multimedia sharing image is displayed in an interface, or a sharing interface of the multimedia sharing image is displayed, or a save interface of the multimedia sharing image is displayed.

The multimedia sharing image represents sharing information about at least one of a clip picture, a clip line content and a clip audio of the target video clip.

In some embodiments, after the target video clip is selected, the clip audio corresponding to the target video clip is played. The clip audio expresses the clip line content in the form of an audio. Playback includes at least one of the following ways. (1) Automatic playback: in response to an operation of selecting a target video clip being completed, a clip audio corresponding to the target video clip is automatically played; and (2) Trigger playback: in response to an operation of selecting a target video clip being completed, a playback control is displayed, and a clip audio corresponding to the target video clip is played based on the trigger operation on the playback control. Schematically, the playback mode of the above audio clip is not unique, and the playback mode may be set freely, which is not limited in the embodiment of the present disclosure.

In one embodiment, the multimedia sharing image includes at least one a clip line content and a first graphic identification code. The first graphic identification code is scanned and positioned to the target video clip in a playback interface.

Schematically, after the target video clip is selected, a clip audio and a clip line content corresponding to the target video clip are determined, the clip audio matches the clip line content, and in response to that multimedia content sharing is performed on the clip audio corresponding to the target video clip, the clip line content corresponding to the clip audio is shared.

Schematically, the multimedia sharing image is a picture, and the clip line content is displayed on the picture. Alternatively, the multimedia sharing image is a picture that includes a cover image, and the cover image includes the clip line content, that is, the cover image and the clip line content exist in the multimedia sharing image. The cover image includes at least one of the following display modes. (1) The cover image is a cover image corresponding to the target video, for example, the target video is a movie, and a cover image corresponding to the movie is a movie poster which is used as the cover image corresponding to the multimedia sharing image. (2) The cover image is an image intercepted from the target video, for example, the target video is a short video, and an image is intercepted from the short video as the cover image corresponding to the multimedia sharing image. (3) The cover image is an image intercepted from the target video clip, for example, an image is arbitrarily intercepted from a target clip video obtained after intercepting the target video as the cover image corresponding to the multimedia sharing image.

In one embodiment, the multimedia sharing image includes a clip line content, and the multimedia sharing image is associated with the clip audio.

Schematically, the clip line content is displayed in the multimedia sharing image in the form of a text, and while generating the multimedia sharing image, an audio file is generated from the clip audio that matches the clip line content (for example, a file in the form of mp3). For example, the target video is a poetry reading video, and a target video clip is obtained from the target video. The target video clip is a video clip with a duration of 1 min corresponding to the climax of the poetry reading video, and the target video clip includes 10 verses (i.e., the clip line content), and the target video clip corresponds to a 1-minute clip audio. Based on the 10 verses and the cover image of the poem reading video, a multimedia sharing image is generated. While generating the multimedia sharing image, an mp3 file is generated from a 1-minute clip audio that matches the 10 verses.

In conclusion, the clip selection operation on the target video is received, a target video clip having a clip line content is selected from the target video, and the target video clip also includes a clip audio that matches the clip line content, and the multimedia sharing image is displayed after the target video is selected. Through the method above, favorite line audio is obtained more conveniently during watching videos, the audio acquisition process is simplified, and the efficiency of human-computer interaction is improved. Moreover, the user may also share the obtained clip line content with the clip audio, so that a receiving party may more quickly know the clip line content and clip audio corresponding to the target video clip.

In the method provided in the embodiment of the present disclosure, several example scenarios of clip selection operations are described, such as, taking a statement selection operation on a target video line content as the clip selection operation; or, taking a trigger operation on a timeline of the target video as the clip selection operation; or, taking a framing operation on the timeline of the target video as the clip selection operation. Through the clip selection operation, the target clip video may be obtained from the target video more quickly, and it is also convenient to determine the clip line content and clip audio corresponding to the target video clip.

According to the method provided by this embodiment, after the target video clip is selected, the clip audio is played while displaying the multimedia sharing image, and the user may preview the accuracy of the intercepted clip audio and the interception effect, improving the efficiency of human-computer interaction.

According to the method provided by this embodiment, the clip line content and/or the first graphic identification code is displayed in the multimedia sharing image, so as to directly share the lines through the clip line content, and through scanning and positioning of the first graphic identification code, the clip audio and lines in the target video clip are shared, improving the efficiency of content sharing.

Figure 4:
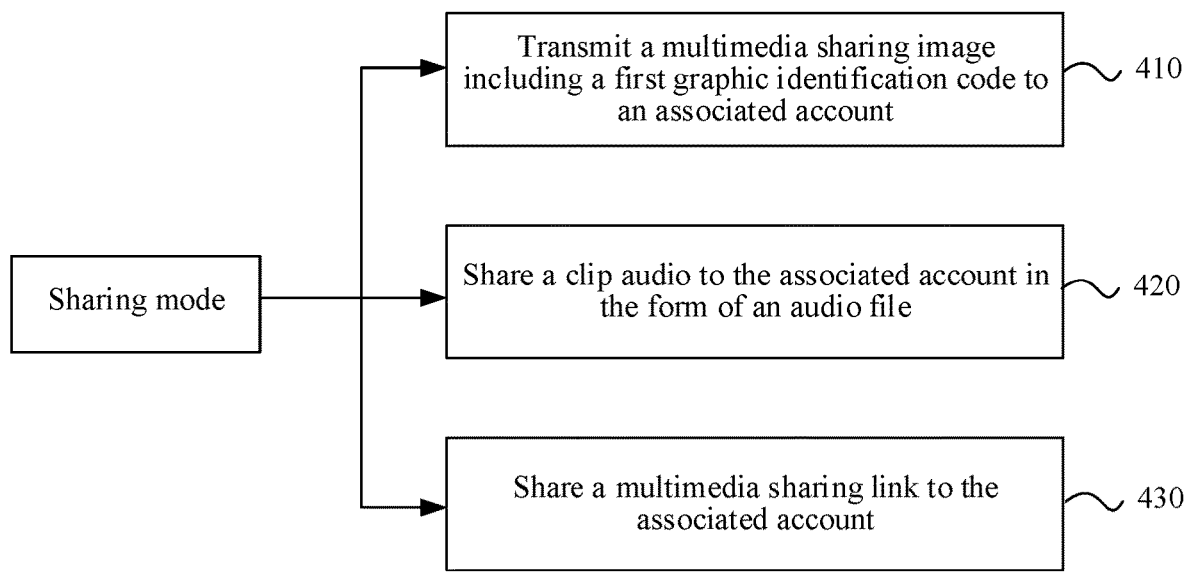
FIG. 4 is a flowchart of a multimedia content sharing method according to another exemplary embodiment of the present disclosure.

In one embodiment, there is an association relationship between the multimedia sharing image and the clip audio, and in the process of sharing the multimedia sharing image, the association relationship between the clip audio and the multimedia sharing image includes a variety of forms. The target account is an account logged in to the terminal that plays the target video, and the associated account is an account associated with the target account. Schematically, as shown in FIG. 4, step 230 of the embodiment as shown in FIG. 2 may also be implemented as at least one of step 410, step 420, or step 430.

Step 410: Transmit a multimedia sharing image including a first graphic identification code to an associated account.

Schematically, the clip line content is shared to the associated account in the form of a multimedia sharing image, and the multimedia sharing image also includes the first graphic identification code.

The multimedia sharing image may be presented on a playback interface in the form of a full screen or a floating layer, for example, in response to that the multimedia sharing image is presented on the playback interface in the form of a floating layer, the brightness of the multimedia sharing image is relatively high, and the brightness of the target video in the playback interface is relatively low.

Alternatively, in response to that the multimedia sharing image is presented on the playback interface in the form of a floating layer, the multimedia sharing image is presented in an entity state, and the target video in the playback interface is presented in a blur state.

In some embodiments, after the target video clip is obtained, a multimedia sharing image is generated according to the clip audio and the clip line content corresponding to the target video. The multimedia sharing image includes a clip line content and a first graphic identification code. The first graphic identification code is scanned to obtain a clip audio for playback. In some embodiments, the first graphic identification code includes at least one of the following representations.

(1) The First Graphic Identification Code is a Barcode Identification.

In some embodiments, barcodes include both barcodes arranged according to certain coding rules to express a set of information, and two-dimensional barcodes (QR codes) that record data symbol information with a specific geometric pattern distributed on a plane in black and white according to a certain law. Schematically, the first graphic identification code is used in scanning and obtaining a clip audio for playback, for example, by scanning a barcode or a QR code, the user may obtain clip audio for playback, where the playback mode includes jumping to a playback interface to play the clip audio, and downloading the clip audio for playback.

Figure 5:
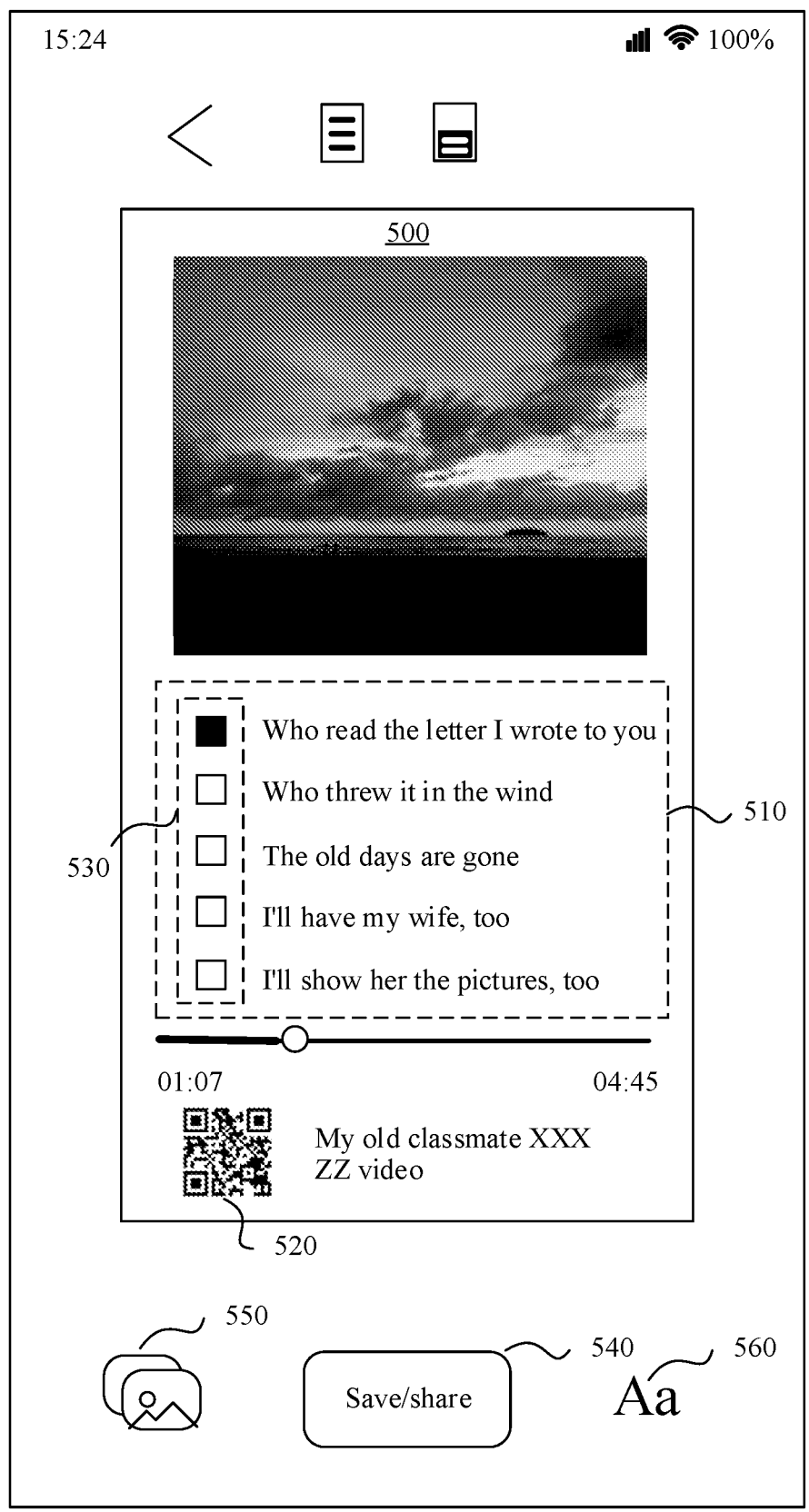
FIG. 5 is an interface diagram of a multimedia content sharing method according to another exemplary embodiment of the present disclosure.

Schematically, FIG. 5 shows a multimedia sharing image corresponding to the target video clip. A clip line content 510 is displayed in the multimedia sharing image in the form of a text, a first playback identification is a QR code identification 520, and the QR code identification 520 is located in the multimedia sharing image (e.g., the bottom left corner of the multimedia sharing image).

(2) The First Graphic Identification Code is a QR Code.

In some embodiments, a scanning operation on the first graphic identification code in the multimedia shared image is received, and it jumps to a target video clip to play a clip audio based on the scanning operation.

Schematically, the target video clip is a 2-minute video intercepted from a movie, a multimedia sharing image is generated based on a clip line content of the 2-minute video, and a first graphic identification code is included in the multimedia sharing image. The first graphic identification code is a QR code in the multimedia sharing image. The QR code is used in obtaining a clip audio of the 2-minute video, receiving a scanning operation on the QR code, obtaining audio information of the movie, automatically jumping to a start timestamp of the 2-minute video and playing the clip audio corresponding to the 2-minute video. In some embodiments, prompt information "Play from the Beginning" is displayed within 3 seconds before the automatic jump. The above is only an illustrative example, which is not limited in the embodiment of the present disclosure.

Step 420: Share the clip audio to an associated account in the form of an audio file.

In some embodiments, the clip line content is shared to the associated account in the form of a multimedia sharing image, and the clip audio is shared to the associated account in the form of an audio file.

Schematically, the audio file is an electronic file generated when generating a multimedia sharing image, and in response to sharing the multimedia sharing image to an associated account, it is selected to share the clip audio matching the clip line content in the multimedia sharing image to the associated account, where the clip audio is transmitted in the form of an audio file. For example, the audio file is transmitted to the associated account through a chat box.

In one embodiment, in response to selecting the target video clip, character information is displayed.

The character information matches the clip line content.

Schematically, the character information may indicate a character source of the clip line content, for example, the clip line content a is a line content narrated by the leading actor, then character information corresponding to the clip line content a is the leading actor; or, the clip line content b is a line content narrated by voice-over, then character information corresponding to the clip line content b is voice-over. In some embodiments, the character information is determined based on the clip line content and the clip audio. Schematically, voiceprint analysis is performed on the clip audio to determine the character information corresponding to the clip audio, and in combination with the clip line content, the character information corresponding to the clip line content may be determined more accurately.

Schematically, in the multimedia sharing image, the clip line content is presented in the form of a text. The clip line content includes a plurality of clip line statements, and character information corresponding to the clip line statement is correspondingly provided in front of each clip line statement, such as, a character name corresponding to the clip line statement; or, an actor name corresponding to the clip line statement; or, a character gender corresponding to the clip line statement. The user may select to display the character information corresponding to the clip line content in the multimedia sharing image, or select to hide the character information corresponding to the clip line statement from the multimedia sharing image.

Schematically, a selection box exists in front of the character information corresponding to each clip line statement. In response to that the user checks the selection box, it is deemed to display the character information of the clip line statement. Alternatively, a default operation is a selection operation, that is, the default is to display the character information of the clip line statement, and in response to that the user checks the selection box, it is deemed to hide the character information of the clip line statement (that is, the character information of the clip line statement is not displayed).

In some embodiments, as shown in FIG. 5, it is a multimedia sharing image corresponding to the target video clip. A clip line content 510 is displayed in the multimedia sharing image in the form of a text, and a selection box 530 exists in front of the character information corresponding to each clip line statement for indicating a display state of the clip line statement. Schematically, a selection operation on the selection box 530 is regarded as an operation of displaying the clip line statement. The selection operation on the selection box 530 includes both a selection by a filling mode and a selection by a checking mode. In some embodiments, the user may also set the character information to an erase display state. Schematically, in a case of determining each clip line statement, the character information corresponding to the clip line statement is hidden by default. However, in response to that the user erases some of a blank part in front of the clip line statement, the character information corresponding to the clip line statement may be displayed, which facilitates improving the interestingness of the multimedia sharing process.

The above is only an illustrative example, which is not limited in the embodiment of the present disclosure.

Step 430: Share a multimedia sharing link to an associated account.

In some embodiments, the multimedia sharing link is transmitted to the associated account. An image display interface corresponding to the multimedia sharing link includes the multimedia sharing image, and the image display interface takes the clip audio as a background audio.

In some embodiments, Based on the clip audio and the clip line content, it jumps to an image display interface corresponding to the multimedia sharing link. The image display interface includes the clip line content, and the image display interface is configured with a clip audio as the background audio.

In some embodiments, the multimedia sharing link is displayed in the form of a text and picture. The text indicates the clip line content of the target video clip. In the multimedia sharing link, the clip line content may include both all the clip line contents and some of the clip line contents, and may also include the clip line content specified by the user. The picture indicates the video content of the target video clip. The picture may be any video frame in the target video clip, or a video frame in the target video clip specified by the user, or a video cover corresponding to the target video.

Schematically, after the user clicks on the multimedia sharing link, it jumps to an audio playback channel, through which the user may play the clip audio corresponding to the target video clip, that is, the audio playback channel is used in jumping to a start timestamp of the target video clip to play the target video clip. In some embodiments, in response to that the target video clip is played to a termination timestamp, the playback of the target video clip is stopped. Alternatively, in response to that the target video clip is played to the termination timestamp, whether to continue playing a video content other than the target video clip is prompted to the user.

In one embodiment, the audio file is hidden in the multimedia sharing image in the form of a control. Schematically, the clip audio is used as a background audio, and the clip audio is played in the form of background music in response to that the multimedia sharing image is displayed. In some embodiments, there is a music identification in the multimedia sharing image, and the user may perform a muting operation, a pause operation, and a playback operation, etc. on the clip audio by clicking the music identification.

In some embodiments, the clip line content and the clip audio are displayed in a synchronous display manner. Schematically, the clip line content is displayed according to the playback order of the clip audio. For example, in response to that the clip audio plays an audio corresponding to a line statement A, the line statement A is presented in the multimedia sharing image. In response to that the clip audio plays an audio corresponding to a line statement B, the line statement B is presented in the multimedia sharing image. In some embodiments, in response to that the line statement B is displayed, the line statement A may be selected to remain in the multimedia sharing image, or only the line statement B may be displayed.

In one embodiment, the multimedia sharing image further includes at least one of the followings: a second graphic identification code, video information of the target video, timeline information corresponding to the target video clip, and a video cover of the target video. The second graphic identification code is used for playing the obtained target video clip.

The video information includes character information and name information, etc. of the video. The timeline information indicates a duration corresponding to the target video. In some embodiments, the timeline information may also indicate a duration of the target video clip. The second playback identification may be a QR code, a link, etc.

The above is only an illustrative example, which is not limited in the embodiment of the present disclosure.

In conclusion, the clip selection operation on the target video is received, a target video clip having a clip line content is selected from the target video, and the target video clip also includes a clip audio that matches the clip line content, and the clip audio is displayed after the target video is selected. Through the method above, favorite line audio is obtained more conveniently during watching videos, the audio acquisition process is simplified, and the efficiency of human-computer interaction is improved.

In the method provided in the embodiment of the present disclosure, several example scenarios for the clip audio are introduced when sharing the multimedia sharing image to the associated accounts, for example, The multimedia sharing image includes a first graphic identification code that may obtain the clip audio. Alternatively, in response to that the multimedia sharing image is shared to the associated account, the clip audio is shared in the form of an audio file. Alternatively, a multimedia sharing link that jumps to a clip audio as the background audio to the associated account. Through the method above, the relevance between the obtained clip line content and the clip audio may be relatively high, an audio obtaining process may be simplified, the efficiency of human-computer interaction may be improved, and the user may also know a timestamp corresponding to the target video clip more conveniently, so as to obtain the clip audio and the clip line content in the target video clip more directly.

Figure 6:
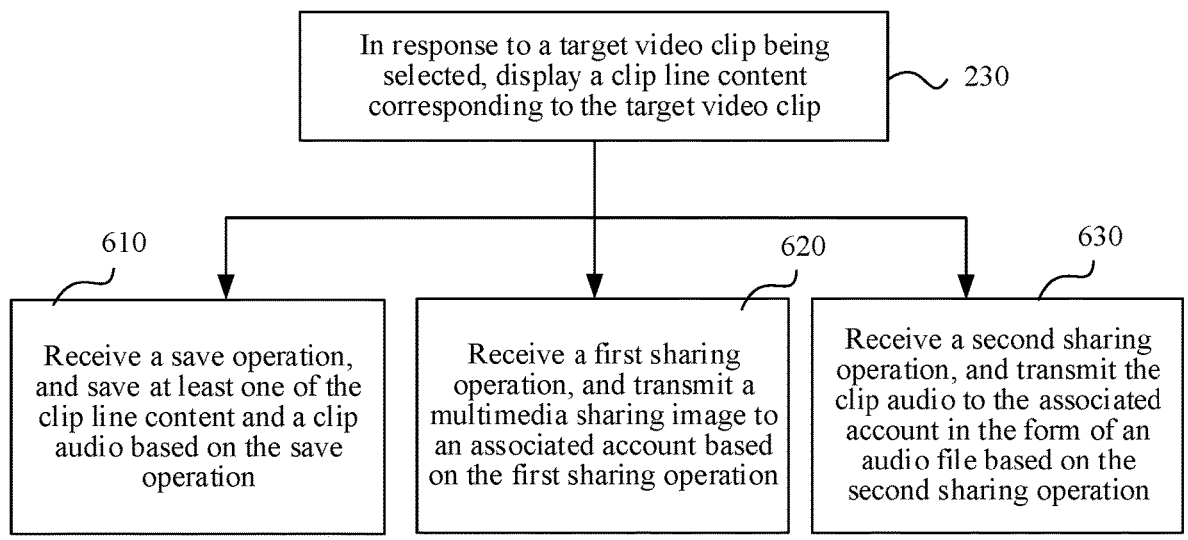
FIG. 6 is a flowchart of a multimedia content sharing method according to another exemplary embodiment of the present disclosure.

In one embodiment, in response to the target video clip being selected, after the clip line content corresponding to the target video clip is displayed, saving or sharing at least one of the clip line content and the clip audio may be selected. Schematically, as shown in FIG. 6, after step 230 of the embodiment as shown in FIG. 2, the method may also include step 610 to step 630 as follows.

Step 610: Receive a save operation, and save at least one of the clip line content and the clip audio based on the save operation.

Schematically, in response to receiving the save operation, a save control is displayed. The save control indicates that at least one of the clip line content and the clip audio is saved.

Schematically, as shown in FIG. 5, in response to receiving the save operation, a "save/share" control 540 is displayed in an interface and used for instructing the user to perform a save/share operation on at least one of the clip line content and the clip audio corresponding to the obtained target video clip. For example, after the user performs a trigger operation on the "save/share" control 540, options of save and share are displayed. In some embodiments, in response to receiving the trigger operation on a save option of the "save/share" control 540, at least one of the clip line content and the clip audio is saved.

In one embodiment, in response to receiving the save operation, a content save option and an audio save option are displayed.

The content save option indicates to save the clip line content, and is configured to initiate saving of the clip line content.

In some embodiments, in response to the content save option being selected, an expression form corresponding to the clip line content is saved. Schematically, the expression form corresponding to the clip line content includes a picture form, a link form, and a dynamic video form, etc. In response to that the save operation on the clip line content is received, a picture, a link, or a dynamic video corresponding to the clip line content is saved.

In some embodiments, the multimedia sharing image is saved based on the selection operation on the content save option. Schematically, the multimedia sharing image includes a clip line content, and in response to that the save operation on the multimedia sharing image is received, the multimedia sharing image is saved.

Schematically, the following describes the saving of the clip line content. In response to that the save operation on the clip line content is received, the clip line content is copied in the form of a text, and the user is prompted that the clip line content is copied to a "clipboard", and the user may paste the clip line content in a note or a chat box. Alternatively, the clip line content is saved to an "album" or a preset storage path in the form of a picture (e.g., the multimedia sharing image). Alternatively, the clip line content is saved in the form of a multimedia sharing image.

In some embodiments, the clip audio is saved based on a selection operation on the audio save option. Schematically, in response to that a save operation on the clip audio is received, the clip audio is saved to the preset storage path in the form of mp3.

In one embodiment, saving the clip audio or the clip line content includes at least one of the following ways. (1) The clip audio or the clip line content is saved locally. (2) The clip audio or the clip line content is saved to the cloud. The above is only an illustrative example, which is not limited in the embodiment of the present disclosure.

Step 620: Receive a first sharing operation, and transmit a multimedia sharing image to an associated account based on the first sharing operation. The associated account is an account that has an association relationship with a target account currently logged in to a terminal.

Schematically, the current terminal is configured to indicate a terminal playing the target video, a target account is logged in to the current terminal, and the target account may be an account logged in to the terminal device, for example, an XX mobile phone is logged in by a system account of the mobile phone. The target account may also be an account logged in by an application program installed on the terminal, for example, the XX mobile phone has a social application program installed, and an account logged in by the social application program is used as the target account.

In some embodiments, the association relationship refers to a direct or indirect connection between the target account logged in to the current terminal and the associated account. The association relationship between the associated account and the target account includes at least one of the following modes: (1) the associated account and the target account are friends; (2) the associated account is in a same group as the target account; and (3) the associated account and the target account have initiated a temporary message conversation, etc.

In one embodiment, in response to receiving a first sharing operation, at least one candidate sharing platform is displayed. The associated account is determined from a specified platform based on a selection operation on the specified platform in the at least one candidate sharing platform. The multimedia sharing image is transmitted to the associated account.

The candidate sharing platform is a preset platform associated with the playback platform of the current target video, and the preset platform includes at least one of an application program, a social platform, and an applet. Schematically, during selection of a candidate sharing platform, one candidate sharing platform may be selected as the specified platform, a plurality of candidate sharing platforms may be selected as the specified platform, for example, a plurality of candidate sharing platforms are selected at the same time, and at least one of the clip line content and the clip audio is transmitted to the plurality of candidate sharing platforms at the same time. Alternatively, the plurality of candidate sharing platforms are selected in sequence.

In some embodiments, in response to that the specified platform is a social application program, the application program corresponds to a plurality of associated accounts associated with the target account, and based on the selection of the associated account in the social application program, at least one of the clip line content and the clip audio is shared with the selected associated account. In some embodiments, in response to that the specified platform is a social platform, for example, moments, an interactive area of Y application program, etc. The social platform is a public platform, i.e., the operation process of not selecting the associated account in response to that at least one of the clip line content and the clip audio are shared to the social platform. The above is only an illustrative example, which is not limited in the embodiment of the present disclosure.

Step 630: Receive a second sharing operation, and transmit the clip audio to an associated account in the form of an audio file based on the second sharing operation.

In one embodiment, in response to receiving the second sharing operation, at least one candidate sharing platform is displayed. The associated account is determined from a specified platform based on a selection operation on the specified platform in the at least one candidate sharing platform. The multimedia sharing image is transmitted to the associated account.

In some embodiments, a sharing operation is first received, and a content share option is displayed, where the content share option includes a first option corresponding to the multimedia sharing image and a second option corresponding to the clip audio, a selection operation received on the first option is the first sharing operation, and a selection operation received on the second option is the second sharing operation.

Schematically, in response to receiving the sharing operation, a sharing control is displayed, the sharing control indicates that at least one of the clip line content and the clip audio is shared. As shown in FIG. 5, in response to that the multimedia sharing image is displayed on an interface, the "save/share" control 540 is displayed under the multimedia sharing image for instructing the user to perform the save or share operation on at least one of the clip line content and the clip audio. For example, after the user performs a trigger operation on the "save/share" control 540, options of save and share are displayed. In some embodiments, in response to receiving the trigger operation on a share option of the "save/share" control 540, at least one of the clip line content and the clip audio is shared.

Figure 7:
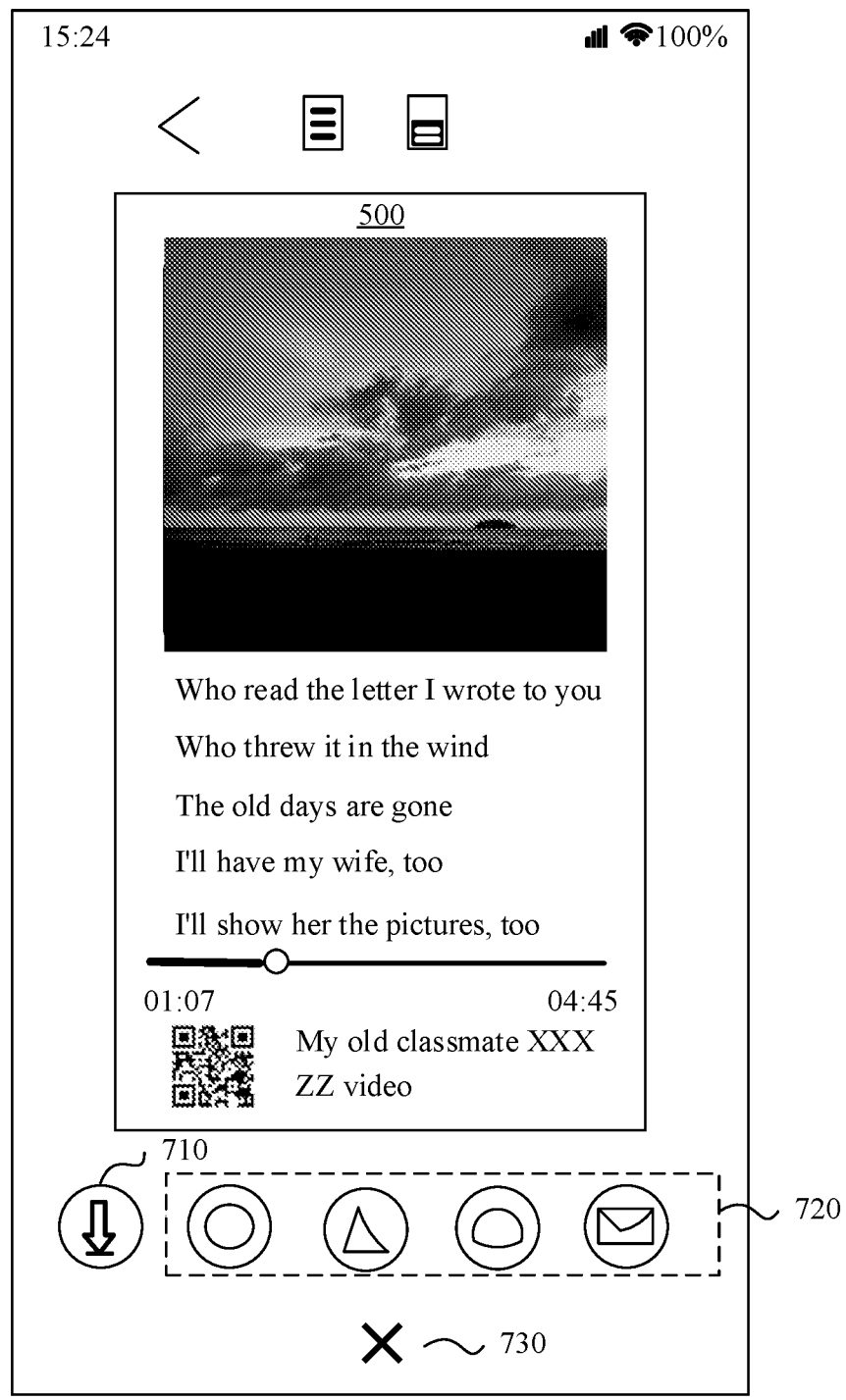
FIG. 7 is an interface diagram of a multimedia content sharing method according to another exemplary embodiment of the present disclosure.

Schematically, after the "save/share" control 540 is triggered, it jumps to an interface as shown in FIG. 7, where the save option 710 is configured to initiate saving of at least one of the clip line content and the clip audio. The share option 720 includes a plurality of sub-options, and each sub-option represents a different sharing party (e.g., different application programs or different associated accounts). In some embodiments, the user triggers a cancel control 730 to cancel the sharing or save operation.

Schematically, after the trigger operation on the share control is received, at least one of the clip line content and the clip audio is shared. Schematically, after the sharing operation on the clip line content is received, the clip line content is shared. In response to that a sharing operation on the clip audio is received, the clip audio is shared, for example, the clip audio is shared to the selected associated account in the form of mp3.

Schematically, the following describes the sharing of the clip line content. In response to that the sharing operation on the clip line content is received, the clip line content is copied in the form of a text, and the user is prompted that the clip line content is copied to the "clipboard", and the user may paste the clip line content in the chat box to realize the sharing of the clip line content. Alternatively, the clip line content is shared to the selected associated account in the form of a picture.

In one embodiment, the user performs a save operation on at least one of the clip line content and the clip audio, and then shares at least one of the clip line content and the clip audio to friends or social platforms. Alternatively, the user may share at least one of the clip line content and the clip audio to friends or social platforms, and then save at least one of the clip line content and the clip audio. The above is only an illustrative example, which is not limited in the embodiment of the present disclosure.

In conclusion, the clip selection operation on the target video is received, a target video clip having a clip line content is selected from the target video, and the target video clip also includes a clip audio that matches the clip line content, and the clip audio is displayed after the target video is selected. Through the method above, favorite line audio is obtained more conveniently during watching videos, the audio acquisition process is simplified, and the efficiency of human-computer interaction is improved.

In the method provided in the embodiment of the present disclosure, two situations are described in which at least one of the clip line content and the clip audio is saved or shared after the clip line content is displayed. That is, after the generated clip line content is displayed, the user may save at least one of the clip line content and the clip audio. Alternatively, after the generated clip line content is displayed, the user may share at least one of the clip line content and the clip audio to friends or social platforms. Through the above methods, it is more convenient to realize the save operation on at least one of the clip line content and the clip audio, and the obtained clip line content and clip audio may also be shared, so that the receiving party may more quickly know a clip line content and a clip audio corresponding to the target video clip and improve the interaction efficiency between the sharing party and the receiving party in the video viewing process, and thus the receiving party may quickly obtain the line audio content shared by the sharing party.

Figure 8:
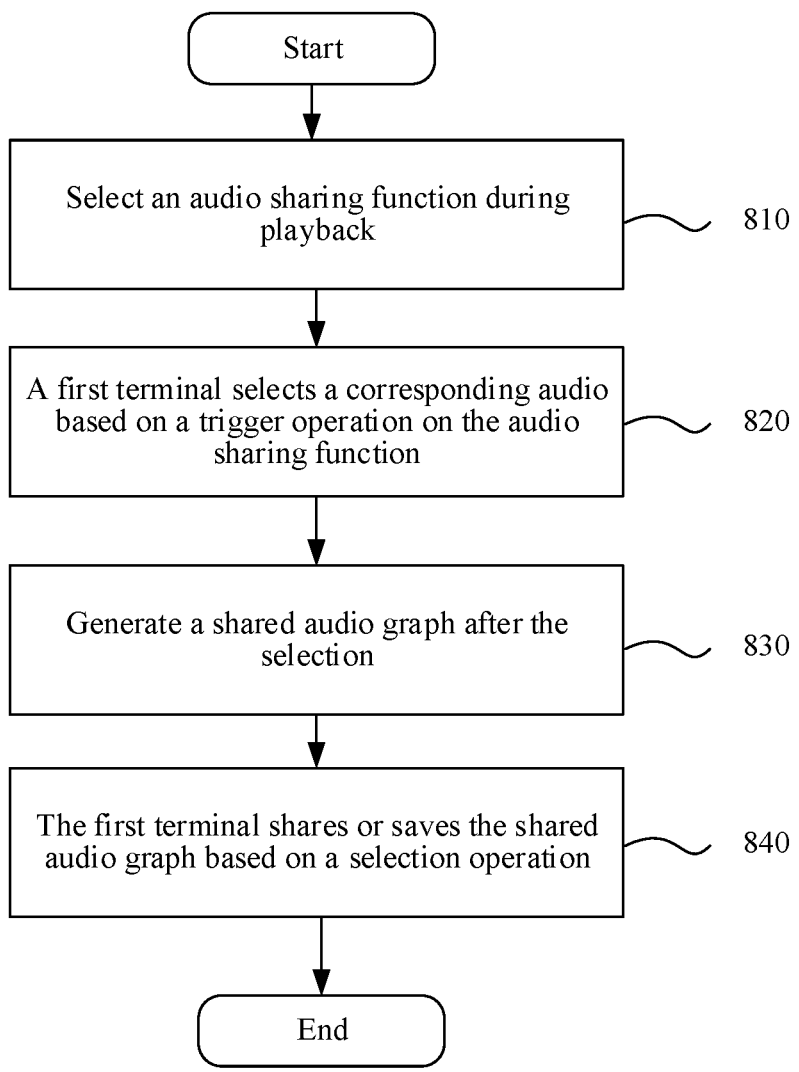
FIG. 8 is a flowchart of a sharing party using a multimedia content sharing method according to another exemplary embodiment of the present disclosure.

In one embodiment, as shown in FIG. 8, a method of sharing at least one of the clip line content and the clip audio is described. Taking a target account logged in to a first terminal playing the target video as an example, the sharing process of the first terminal corresponding to the target account includes step 810 to step 840 below.

Step 810: Select an audio sharing function during playback.

Schematically, the target video is played on a video playback interface, a terminal logged in to the target account is used as the first terminal, and an audio sharing control exists on the video playback interface, and the audio sharing control indicates the trigger of the audio sharing function. In response to receiving the trigger operation of the sharing party on the audio sharing control on the video playback interface, a selection operation on the audio sharing function is realized.

Step 820: The first terminal selects a corresponding audio based on the trigger operation on the audio sharing function.

Schematically, the first terminal intercepts a video clip in the target video based on the audio sharing function to obtain a target video clip. The target video clip corresponds to the clip line content and the clip audio, and the clip line content matches the clip audio. A mode corresponding to the audio sharing function indicates a mode of obtaining a clip of the target video, such as, obtaining the target video clip by marking a timestamp; or, obtaining the target video clip through long-press of the clip line content, etc.

Step 830: Generate a shared audio graph after the selection.

Schematically, as shown in FIG. 5, a shared audio graph 500 is generated after the target video clip is selected. The shared audio graph 500 is located in an interface. The shared audio graph 500 includes a picture, a timeline, a video name, related personnel, etc.

In some embodiments, a picture in the shared audio graph 500 may be a video frame in the target video clip, or at least one picture is selected from an album library or network album as the picture in the shared audio graph 500 by clicking a picture selection control 550 below the shared audio graph on the first terminal. In some embodiments, the timeline in the shared audio graph 500 may be a timeline corresponding to the target video or a timeline corresponding to the target video clip. In some embodiments, in response to that the timeline in the shared audio graph 500 is a timeline corresponding to the target video, a time period corresponding to the target video clip presents a special mark on the timeline corresponding to the target video, for example, the time period corresponding to the target video clip is in a bold state on the timeline corresponding to the target video. Alternatively, the time period corresponding to the target video clip is in a color state on the timeline corresponding to the target video.

In some embodiments, the video name in the shared audio graph 500 may be a video name corresponding to the target video or a self-defined name. Schematically, the target video is a movie called "My Old Classmate", and the video name in the shared audio graph 500 is displayed as "My Old Classmate". Alternatively, the video name in the shared audio graph 500 is self-defined. For example, the video name in the shared audio graph 500 is set to "Classmate".

In some embodiments, the related personnel in the shared audio graph 500 may be a director, a screenwriter, or a star of the target video, etc. Schematically, the related personnel in the shared audio graph 500 is set as the director of the target video by default, and the sharing party may select to change the default setting, for example, the related personnel in the shared audio graph 500 is set as a leading actress, etc.

In some embodiments, the shared audio graph 500 may also include the source of the target video, for example, the target video is derived from a ZZ video. In addition, two controls above the shared audio graph 500 indicate a display location of the clip line content. Schematically, in response to that a left control is triggered, the clip line content is displayed inside a picture of the shared audio graph 500, that is, displayed above the picture of the shared audio graph 500. In response to that a right control is triggered, the clip line content is displayed below the picture of the shared audio graph 500, etc. The clip line content may also be "size adjustment", "font adjustment", "color adjustment", etc. through an "Aa" control 560 below the shared audio graph 500.

Step 840: The first terminal shares or saves the shared audio graph based on the selection operation.

Schematically, a "save/share" control is displayed below the shared audio graph 500 for indicating an operation (a save operation or a sharing operation) on the shared audio graph 500.

In some embodiments, after a trigger operation is performed on the "save/share" control below the shared audio graph 500, it jumps to FIG. 7, FIG. 7 includes the shared audio graph 500, but the control below the shared audio FIG. 500 changes. Schematically, the options below the shared audio graph 500 include: a save option 710, configured to save the shared audio graph 500 or a clip line content and a clip audio corresponding to a shared audio graph; and a share option 720, configured to initiate sharing of the shared audio graph 500 or the clip line content and the clip audio corresponding to the shared audio graph. The share option includes at least one sub-option indicating the sharing to the associated account or social platforms. Schematically, in response to the trigger operation on the save option 710, the shared audio graph 500 or the clip line content and the clip audio corresponding to the shared audio graph are saved.

In one embodiment, the second terminal receives a multimedia sharing image transmitted by the target account, and the multimedia sharing image is a content shared after the target account selects the target video clip in the target video, and the target video clip corresponds to the clip audio and clip line content, and the clip audio matches the clip line content. A trigger operation on the multimedia sharing image is received. A clip audio corresponding to the multimedia sharing image is played based on the trigger operation.

In one embodiment, a trigger operation on a multimedia sharing image is received. The multimedia sharing image includes a clip line content and a first graphic identification code. The first graphic identification code is scanned to obtain a clip audio for playback. Alternatively, a trigger operation on an image display interface is received, the image display interface is configured with a clip audio as the background audio, the image display interface displays the generated multimedia sharing image as a multimedia sharing content, and the multimedia sharing image includes a clip line content. Alternatively, a trigger operation on a multimedia sharing link is received, the multimedia sharing link includes a clip line content, and the multimedia sharing link is used for providing a playback channel for playing a clip audio.

Figure 9:
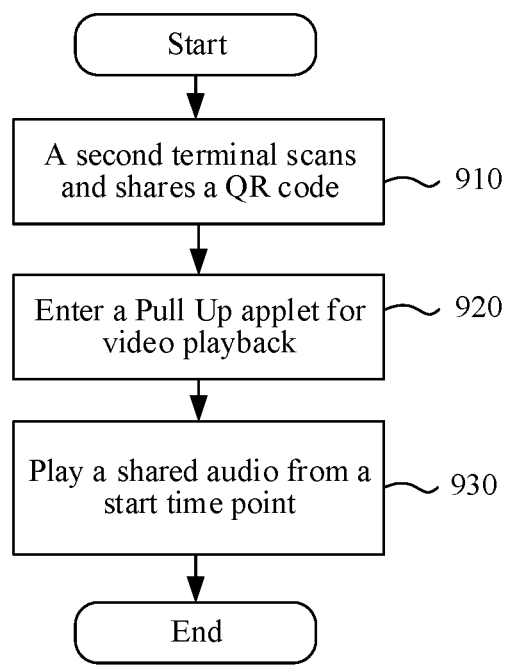
FIG. 9 is a flowchart of a receiving party using a multimedia content sharing method according to another exemplary embodiment of the present disclosure.

In some embodiments, FIG. 9 illustrates an operation performed by the second terminal after the first terminal corresponding to the target account transmits a multimedia sharing image to the second terminal corresponding to the associated account. The process of viewing the multimedia sharing image through the second terminal corresponding to the associated account includes step 910 to step 930 as follows.

Step 910: The second terminal scans a QR code.

Schematically, the second terminal includes both a terminal corresponding to the associated account that receives the multimedia sharing image through the chat box, and a terminal corresponding to the associated account that views the multimedia sharing image through the social platform. In some embodiments, the first terminal transmits a multimedia sharing image to the second terminal through the chat box, and the clip line content is presented in the multimedia sharing image, and the multimedia sharing image includes a QR code, which indicates to obtain a clip audio corresponding to the target video clip. After the second terminal receives the multimedia sharing image, a QR code in the multimedia sharing image is scanned to achieve the purpose of obtaining the clip audio.

Step 920: Enter a Pull Up applet for video playback.

Schematically, the second terminal scans the QR code and jumps to s corresponding interface. For example, after the second terminal scans the QR code, it automatically enters an applet page and displays the target video in the applet page.

Step 930: Play a shared audio from a start time period.

Schematically, based on the selection of the target video clip, playback starts from a start timestamp of the target video clip in the applet page, that is, after the applet page is entered, playback automatically starts from the start timestamp of the target video clip until it reaches a location corresponding to a termination timestamp of the target video clip.

In conclusion, the clip selection operation on the target video is received, the target video clip with the clip line content is selected from the target video, and the target video clip also includes the clip audio that matches the clip line content, and after the target video is selected, the clip audio is played, and the clip audio may be combined with the clip line content corresponding to the clip audio for multimedia content sharing. Through the method above, a favorite line audio may be obtained more conveniently when watching the video, which simplifies the audio obtaining process, improving the interaction efficiency between the sharing party and the receiving party during the video viewing process, so that the receiving party may quickly obtain the line audio content shared by the sharing party.

Figure 10:
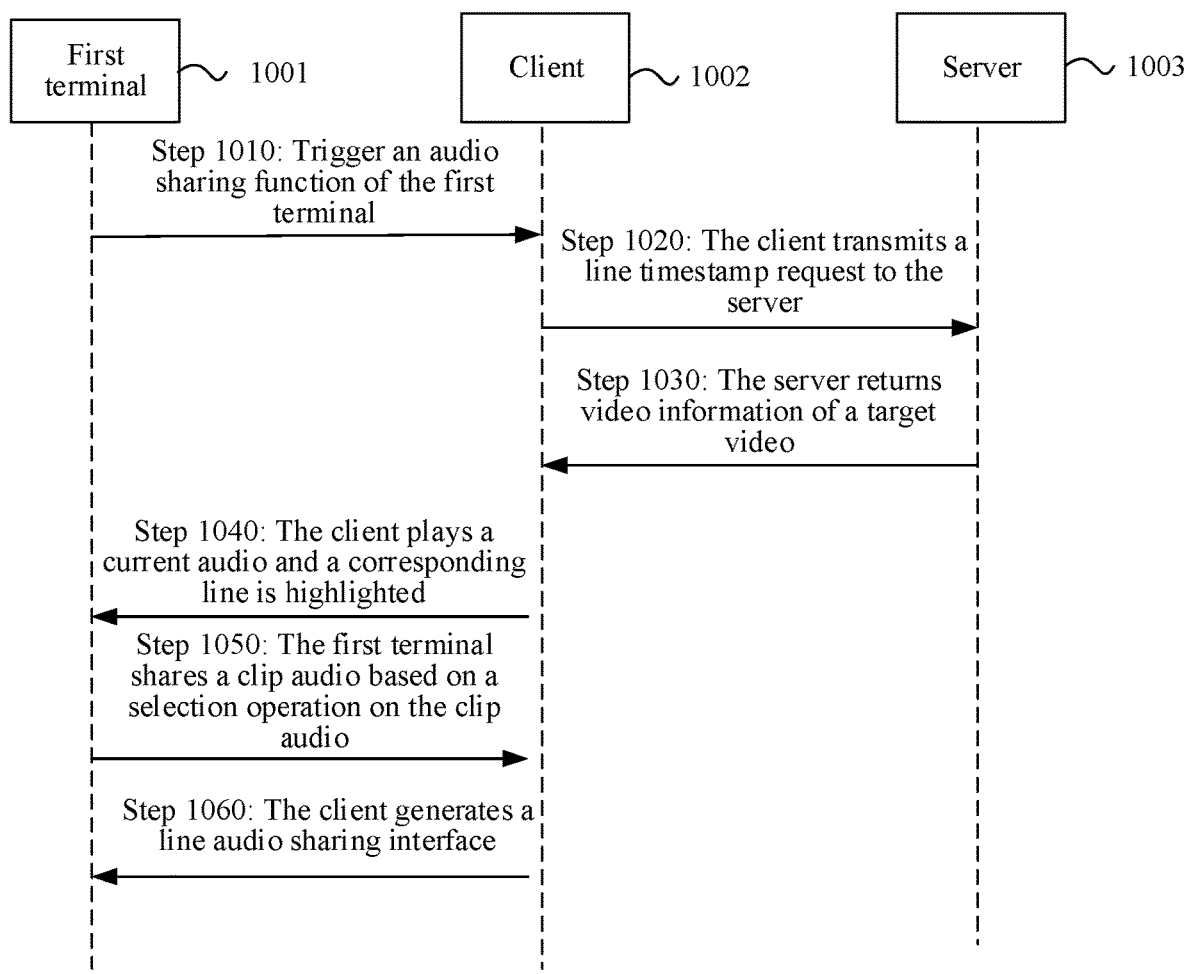
FIG. 10 is a schematic interaction diagram of a multimedia content sharing method according to an exemplary embodiment of the present disclosure.

In one embodiment, FIG. 10 illustrates a schematic diagram of interactive relationships among a first terminal 1001, a client 1002 and a server 1003 provided in an exemplary embodiment.

Step 1010: Trigger an audio sharing function of the first terminal 1001.

Schematically, the first terminal 1001 receives a trigger operation on the audio sharing function on a playback interface during playback of the target video.

Step 1020: The client 1002 transmits a line timestamp request to the server 1003.

Schematically, the client 1002 is an application program or an applet installed in the first terminal 1001, the client 1002 transmits a line timestamp request of the target video to the server 1003, where the line timestamp request is configured to obtain a line timestamp corresponding to the target video from the server, and the line timestamp includes a line content of the target video and a timestamp corresponding to the line content. Schematically, a line timestamp corresponding to line A is "00:32". Alternatively, a line timestamp corresponding to line B is "01:32", etc.

Step 1030: The server 1003 returns video information of the target video.

The video information of the target video includes line timestamp information of the target video, and clip line content and character information corresponding to the line timestamp information. Schematically, the server 1003 returns the line timestamp information of the target video and the recognized character information.

The line timestamp information indicates timestamp information corresponding to the clip line content, and the character information indicates a character corresponding to the clip line content, such as, character name, character actor name, and character gender. In some embodiments, after the client 1002 transmits the line timestamp request to the server 1003, the server 1003 feeds back all the video information of the target video to the client 1002.

Figure 11:
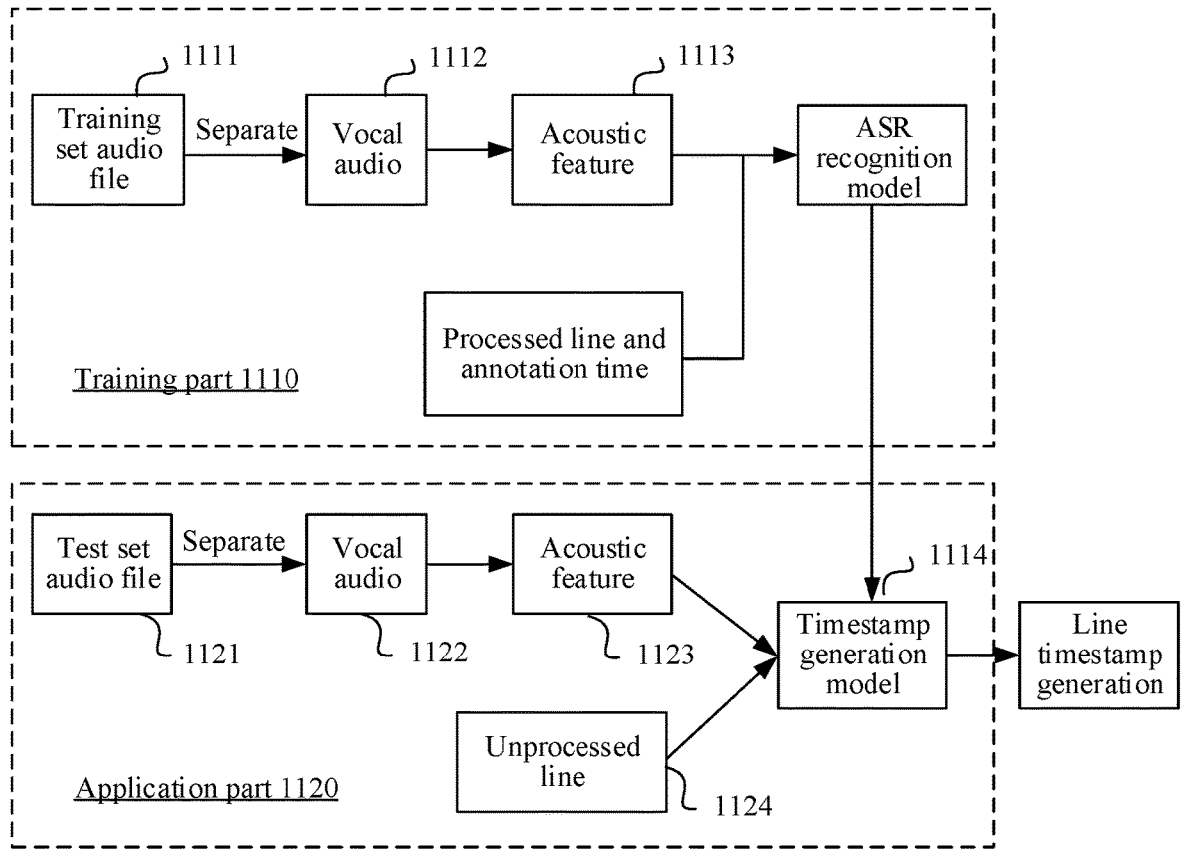
FIG. 11 is a flowchart of a timestamp generation model according to an exemplary embodiment of the present disclosure.

In one embodiment, the server 1003 obtains video information of the target video. The video information includes timestamp information corresponding to the clip line content and character information corresponding to the clip line content. Schematically, the timestamp information corresponding to the clip line content is obtained by a trained timestamp generation model. The character information corresponding to the clip line content is obtained by a trained voiceprint recognition model. Schematically, as shown in FIG. 11, the timestamp generation model is introduced. The timestamp generation model includes: (1) a training part 1110; and (2) an application part 1120.

(1) Training Part 1110

In some embodiments, the timestamp generation model is obtained by training an audio file in a training set. Schematically, an audio content of a training set audio file 1111 is first preprocessed (e.g., splitting, cleaning, etc.) to reduce the noise of the audio content in the training set. Then, vocal audio separation is performed on the preprocessed audio content through a deep learning algorithm to obtain a vocal audio 1112. Then, feature extraction is performed on the vocal audio 1112 to obtain an acoustic feature 1113 corresponding to the vocal audio 1112. Finally, comparative verification is performed on the acoustic feature 1113, the processed lines and annotation time by using an automatic speech recognition (ASR) model, and the model is trained according to a verification result to generate a final timestamp generation model 1114.

(2) Application Part 1120

Figure 12:
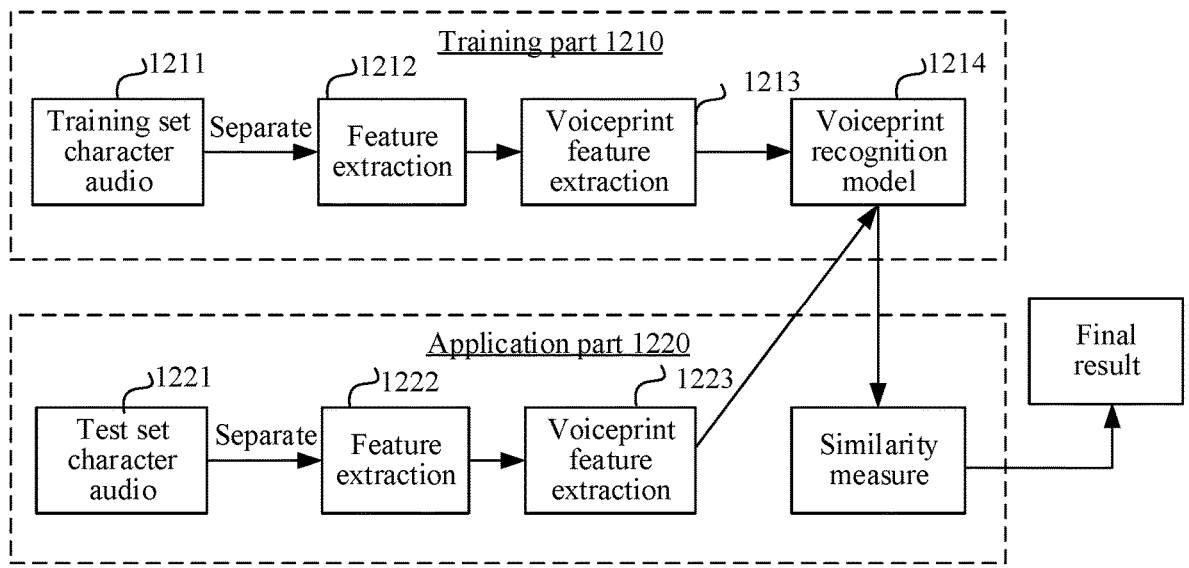
FIG. 12 is a block diagram of a voiceprint recognition model according to an exemplary embodiment of the present disclosure.

In some embodiments, an audio content in a test set audio file 1121 is preprocessed (e.g., splitting, cleaning, etc.). Then, vocal audio separation is performed on the preprocessed audio content through a deep learning algorithm to obtain a vocal audio 1122. Then, feature extraction is performed on the vocal audio 1122 to obtain an acoustic feature 1123 corresponding to the vocal audio 1122. Finally, the acoustic feature 1123 and an unprocessed line 1124 are inputted into the trained timestamp model, to obtain a line timestamp corresponding to the test set audio file 1121. That is, after a test audio is subjected to the same audio preprocessing and acoustic feature extraction as the training audio, a line timestamp is generated by means of the timestamp generation model 1114 obtained by training the audio. Schematically, as shown in FIG. 12, the voiceprint recognition model is introduced. The voiceprint recognition model includes: (1) a training part 1210; and (2) an application part 1220.

(1) Training Part 1210

In some embodiments, the voiceprint recognition model is obtained by training a character audio in the training set. Schematically, first, feature extraction 1212 is performed on an audio content in a training set character audio 1211, to extract sound features of different characters. Then, voiceprint feature extraction 1213 is performed on the sound features to obtain voiceprint features corresponding to the sound features. The voiceprint features are relatively stable and more specific than the sound features. Finally, the model is trained based on the voiceprint features, to generate a final voiceprint recognition model 1214.

(2) Application Part 1220

In some embodiments, first, feature extraction 1222 is performed on an audio content in a test set character audio 1221, and sound features of different characters are extracted. Then, voiceprint feature extraction 1223 is performed on the sound features to obtain voiceprint features corresponding to the sound features. Then, the voiceprint features are inputted into the trained voiceprint recognition model 1214, and a recognition result of the voiceprint recognition model 1214 is compared with a similarity between the voiceprint features for similarity scoring, and character information corresponding to the line is determined based on a score result (a final result).

Figure 13:
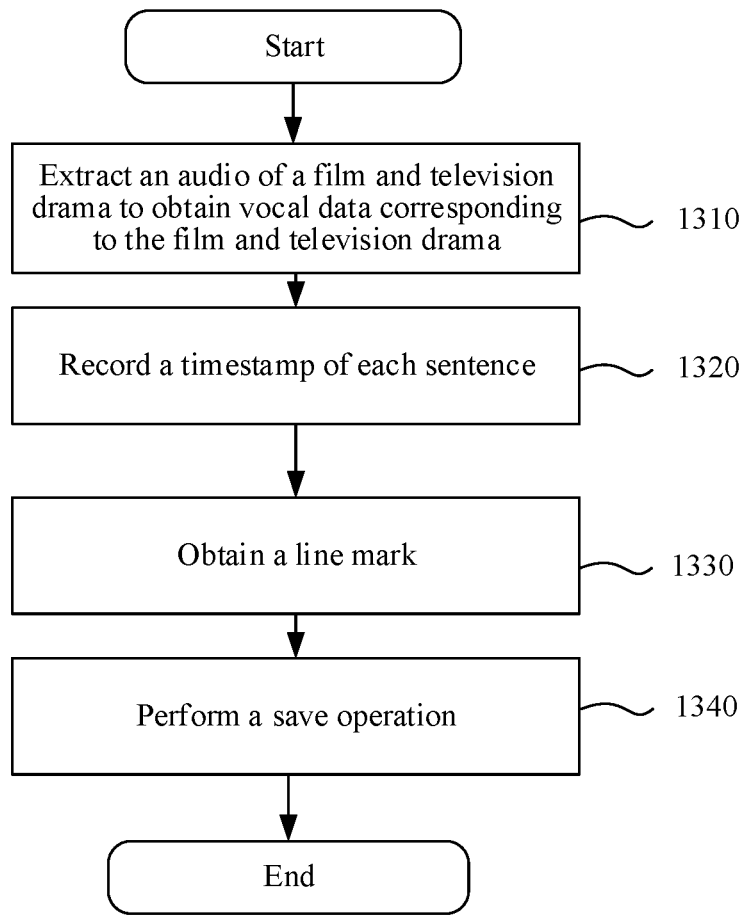
FIG. 13 is a flowchart of a multimedia content sharing method according to an exemplary embodiment of the present disclosure.

In one embodiment, the following describes by taking analysis of a film and television drama as an example, as shown in FIG. 13.

Step 1310: Extract an audio of the film and television drama to obtain vocal data corresponding to the film and television drama.

The vocal data is used for performing audio training on a character in the film and television drama through the audio content of the training set for the voiceprint recognition process.

Step 1320: Record a timestamp of each sentence.

Schematically, after the audio content of the training set is preprocessed, vocal data 1310 is separated through the deep learning algorithm to obtain vocal audio data. ASR recognition is performed on an audio feature corresponding to the vocal audio data to obtain a text corresponding to the audio, and the timestamp of each sentence is recorded.

Step 1330: Obtain a line mark.

Schematically, the recognized text is compared with a pre-marked line to obtain the line mark used for marking the line content in the film and television drama.

Step 1340: Perform a save operation.

Schematically, the line mark, a timestamp, and a character corresponding to the line are saved, for example, The line mark, the timestamp and the character corresponding to the line are saved to the server 1003 to complete an analysis process of the film and television drama.

Step 1040: The client 1002 plays a current audio and a corresponding line is highlighted.

The client 1002 is a client playing the target video. In some embodiments, in the playback process of the target video, in response to the trigger operation on the audio sharing function, the client 1002 displays a line selection interface used for selecting the line content of the target video, and the audio content corresponding to the current target video is played in the line selection interface, a corresponding line timestamp is matched according to a timestamp of the playback audio, and a line corresponding to the audio at the current moment is highlighted.

Step 1050: The first terminal 1001 shares a clip audio based on a selection operation on the clip audio.

Schematically, the first terminal 1001 realizes the selection operation on the target video clip based on a drag operation on a target video timeline. Alternatively, based on the line selection interface, the first terminal 1001 receives the selection operation on the line content in the line selection interface, determines a line clip content, and determines, based on the line clip content, a clip audio that matches the line clip content.

Step 1060: The client 1002 generates a line audio sharing interface.

In some embodiments, On the basis that the first terminal 1001 selects a target video clip, the client 1002 uploads the target video clip to the server 1003. Schematically, the first terminal 1001 may select a video frame from the target video clip as a picture on the line audio sharing interface, and may also select an image from the album as the picture on the line audio sharing interface, and or use a default picture as the picture on the line audio sharing interface (for example, the cover of the target video is the picture on the line audio sharing interface by default).

In some embodiments, the first terminal 1001 triggers a save function on the line audio sharing interface, and requests the server 1003 to download an audio content file corresponding to the target video clip. Alternatively, the first terminal 1001 triggers a sharing function on the line audio sharing interface, and the client 1002 pops up a social platform that supports sharing, thereby realizing the audio sharing operation.

In conclusion, the clip selection operation on the target video is received, the target video clip with the clip line content is selected from the target video, and the target video clip also includes the clip audio that matches the clip line content, and after the target video is selected, the clip audio is played, and the clip audio may be combined with the clip line content corresponding to the clip audio for multimedia content sharing. Through the method above, a favorite line audio may be obtained more conveniently when watching the video, which simplifies the audio obtaining process, improving the interaction efficiency between the sharing party and the receiving party during the video viewing process, so that the receiving party may quickly obtain the line audio content shared by the sharing party.

Figure 14:
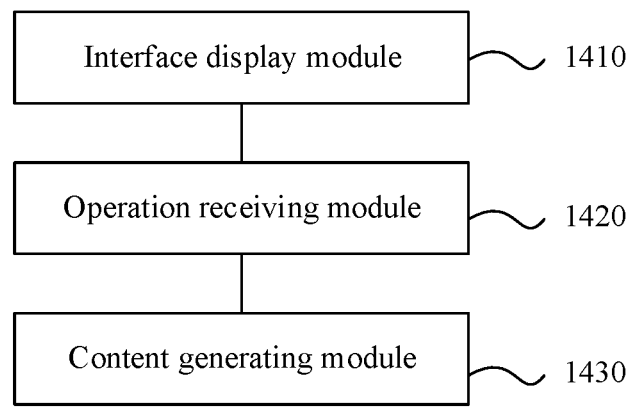
FIG. 14 is a structural block diagram of a multimedia content sharing apparatus according to an exemplary embodiment of the present disclosure.

FIG. 14 is a structural block diagram of a multimedia content sharing apparatus according to an exemplary embodiment of the present disclosure. As shown in FIG. 14, the apparatus includes the following parts:

an interface display module 1410, configured to display a target video;

an operation receiving module 1420, configured to receive a clip selection operation on the target video, the clip selection operation being configured to select a target video clip in the target video; and a content generating module 1430, configured to generate, based on the clip selection operation, a multimedia sharing image corresponding to the target video clip, the multimedia sharing image representing sharing information about at least one of a clip picture, a clip line content, and a clip audio of the target video clip.

Figure 15:
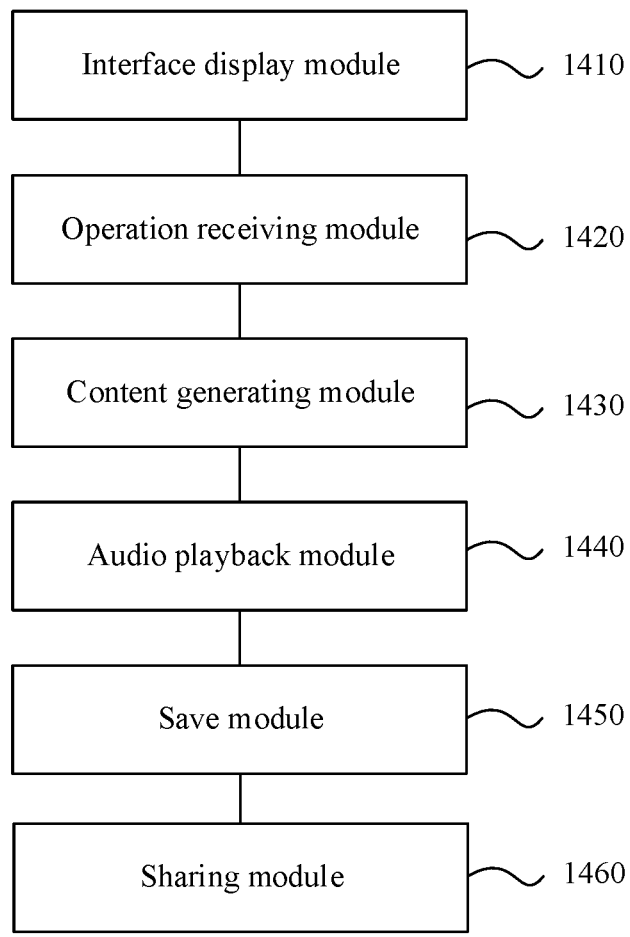
FIG. 15 is a structural block diagram of a multimedia content sharing apparatus according to another exemplary embodiment of the present disclosure.

In one embodiment, as shown in FIG. 15, the interface display module 1410 is further configured to display the multimedia sharing image, or, the apparatus further includes:

an audio playback module 1440, configured to play the clip audio while displaying the multimedia sharing image; in response to the target video clip being selected, the clip audio expressing the clip line content in the form of an audio.

In one embodiment, the multimedia sharing image further includes at least one of the following contents:

a clip line content; and a first graphic identification code, the first graphic identification code being scanned and positioned to the target video clip in a playback interface.

In one embodiment, the apparatus further includes:

a save module 1450, configured to receive a save operation, and save at least one of the clip line content and the clip audio based on the save operation; and a sharing module 1460, configured to receive a first sharing operation, and transmit the multimedia sharing image to an associated account based on the first sharing operation, the associated account being an account that has an association relationship with a target account currently logged in to a terminal; or, receive a second sharing operation, and transmit the clip audio to an associated account in the form of an audio file based on the second sharing operation.

In one embodiment, the save module 1450 is further configured to display a content save option and an audio save option in response to the save operation, the content save option being configured to initiate saving of the clip line content, and the audio save option being configured to initiate saving of the clip audio; and save the multimedia sharing image in response to the content save option being selected; and save the clip audio in response to the audio save option being selected.

In one embodiment, the sharing module 1460 is further configured to display at least one candidate sharing platform in response to the first sharing operation, the candidate sharing platform being a preset platform associated with a playback platform of the current target video; determine the associated account from a specified platform based on a selection operation on the specified platform in the at least one candidate sharing platform; and transmit the multimedia sharing image to the associated account.

In one embodiment, the sharing module 1460 is further configured to transmit a multimedia sharing link to the associated account, where an image display interface corresponding to the multimedia sharing link includes the multimedia sharing image, and the image display interface takes the clip audio as a background audio.

In one embodiment, the multimedia sharing image includes the first graphic identification code.

The apparatus is further configured to receive a scanning operation on the first graphic identification code in the multimedia sharing image; and skip to the target video clip based on the scanning operation, to play the clip audio.

In one embodiment, the operation receiving module 1420 is further configured to receive a statement selection operation on a line content of the target video as the clip selection operation, the statement selection operation being configured to select at least one line statement; and determine a video clip corresponding to the at least one line statement as the target video clip.

In one embodiment, the operation receiving module 1420 is further configured to receive a long-press operation on the line content of the target video; display a line selection interface based on the long-press operation, the line selection interface including a line statement in the line content; and receive a selection operation on the at least one line statement in the line selection interface.

In one embodiment, the operation receiving module 1420 is further configured to receive a first trigger operation on a timeline of the target video, the first trigger operation being configured to determine a start timestamp of the target video clip; receive a second trigger operation on the timeline of the target video, the second trigger operation being configured to determine a termination timestamp of the target video clip; and determine the target video clip based on the start timestamp and the termination timestamp.

In one embodiment, the operation receiving module 1420 is further configured to receive a framing operation on a timeline of the target video as the clip selection operation; and determine, based on a target time period corresponding to the framing operation on the timeline, a video within the time period as the video clip.

In one embodiment, the apparatus is further configured to display character information in response to the target video clip being selected, where the character information matches the clip line content.

In one embodiment, the multimedia sharing image includes the clip line content.

The apparatus is further configured to display a specified range of line contents including the clip line content in the multimedia sharing image, where the clip line content is highlighted.

In one embodiment, the multimedia sharing image includes a cover image.

The apparatus is further configured to take a cover image corresponding to the target video as the cover image in the multimedia sharing image; or, take an image captured from the target video as the cover image in the multimedia sharing image; or take an image captured from the target video clip as the cover image in the multimedia sharing image.

Figure 16:
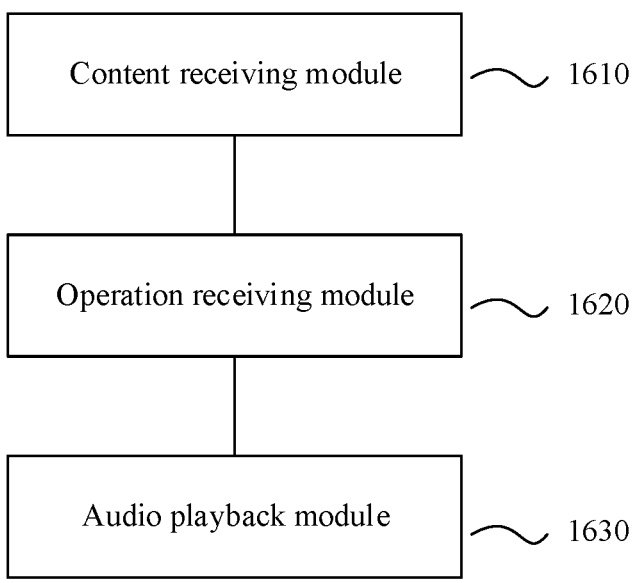
FIG. 16 is a structural block diagram of a multimedia content sharing apparatus according to another exemplary embodiment of the present disclosure.

FIG. 16 is a structural block diagram of a multimedia content sharing apparatus according to another exemplary embodiment of the present disclosure. As shown in FIG. 16, the apparatus includes the following parts:

a content receiving module 1610, configured to receive a multimedia sharing image from a target account, the multimedia sharing image being a content shared after the target account selects a target video clip in a target video;

an operation receiving module 1620, configured to receive a trigger operation on the multimedia sharing image; and an audio playback module 1630, configured to play, based on the trigger operation, a clip audio in the multimedia sharing image.

It is to be illustrated that according to the multimedia content sharing apparatus provided by the foregoing embodiment, the above functional modules are only described for exemplary purposes. In actual applications, the functions may be allocated to different functional modules according to specific needs, which means that the internal structure of a device is divided to different functional modules to complete all or some of the above described functions. In addition, the multimedia content sharing apparatus provided by the foregoing embodiment and the embodiment of the multimedia content sharing method belong to the same concept. For the specific implementation process and beneficial effects of the apparatus, refer to the method embodiment for detail, which is not further described herein.

Figure 17:
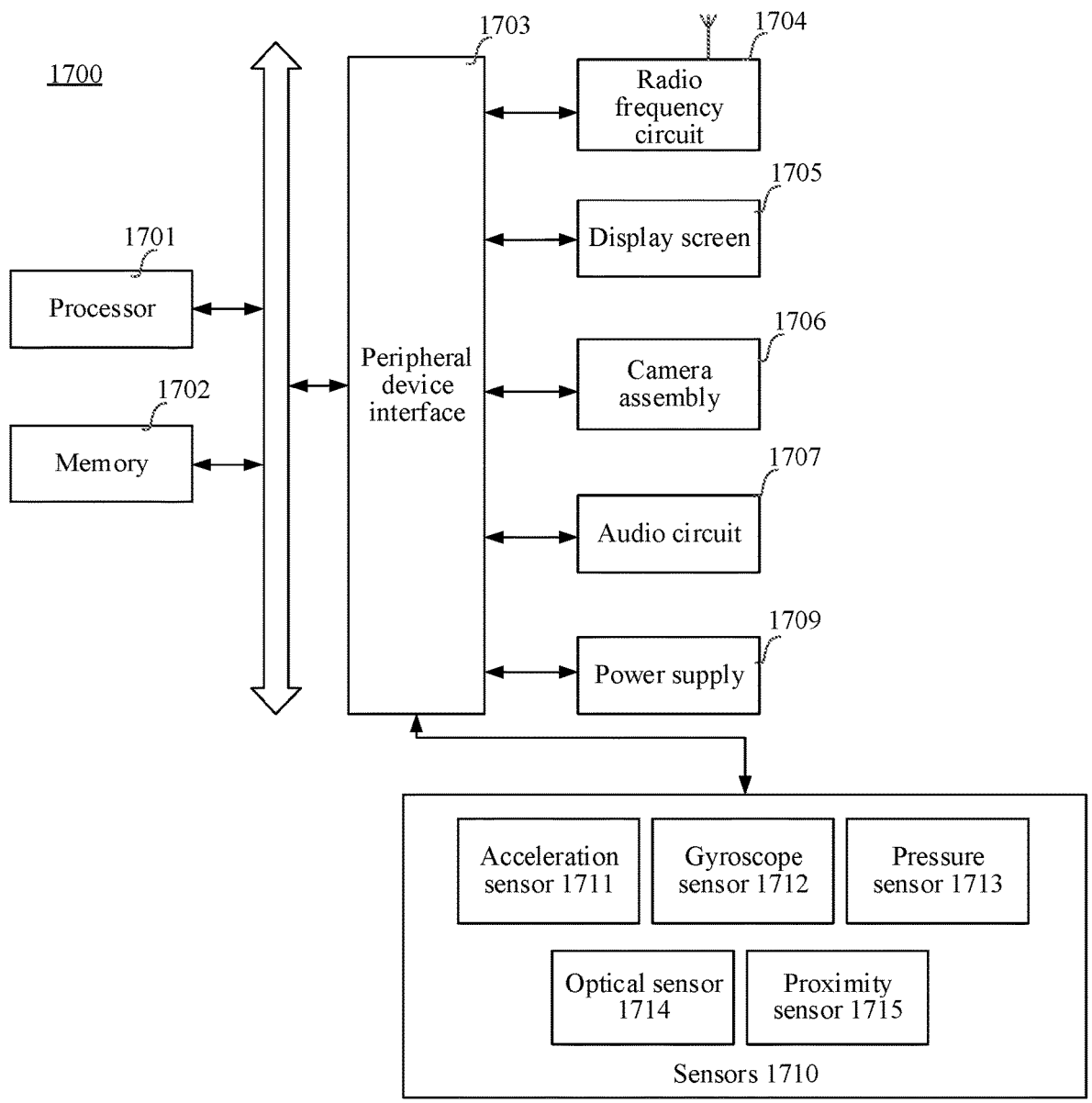
FIG. 17 is a structural block diagram of a terminal according to an exemplary embodiment of the present disclosure.

FIG. 17 is a structural block diagram of a computer device 1700 according to an exemplary embodiment of the present disclosure. The computer device 1700 may be a terminal or a server.

Generally, the computer device 1700 includes: a processor 1701 and a memory 1702. The processor 1701 includes one or more processing cores, for example, a 4-core processor or an 8-core processor. The memory 1702 may include one or more computer-readable storage media. The computer-readable storage medium may be non-transient. The memory 1702 may further include a high-speed random access memory and a nonvolatile memory, for example, one or more disk storage devices or flash storage devices. In some embodiments, a non-transitory computer-readable storage medium in the memory 1702 is configured to store at least one instruction, and the at least one instruction is executed by the processor 1701 to implement the multimedia content sharing method provided in the method embodiment of the present disclosure.

In some embodiments, the computer device 1700 may further include: a peripheral device interface 1703 and at least one peripheral device. The processor 1701, the memory 1702, and the peripheral device interface 1703 may be connected to each other through a bus or a signal line. Each peripheral device may be connected to the peripheral device interface 1703 through the bus, the signal line, or a circuit board. Specifically, the peripheral device includes: at least one of a radio frequency circuit 1704, a display screen 1705, a camera assembly 1706, an audio circuit 1707, and a power supply 1709. In some embodiments, the computer device 1700 also includes one or more sensors 1710. The one or more sensors 1710 include, but are not limited to: an acceleration sensor 1711, a gyroscope sensor 1712, a pressure sensor 1713, an optical sensor 1714, and a proximity sensor 1715.

Those skilled in the art can understand that the structure shown in FIG. 17 does not constitute a limitation on the computer device 1700, and may include more or fewer components than shown in the figure, or combine some components, or adopt different component arrangements.

The embodiment of the present disclosure also provides a computer device. The computer device may be implemented as the terminal or server as shown in FIG. 2. The computer device includes a processor and a memory. The memory stores at least one instruction, at least one program, and a code set or an instruction set, and the at least one instruction, the at least one program, and the code set or the instruction set are loaded and executed by the processor to implement the multimedia content sharing method according to the foregoing method embodiments.

The embodiment of the present disclosure further provides a computer-readable storage medium. The computer-readable storage medium stores at least one instruction, at least one program, and a code set or an instruction set. The at least one instruction, the at least one program, and the code set or the instruction set are loaded and executed by a processor to implement the multimedia content sharing method according to the foregoing method embodiments.

The embodiments of the present disclosure further provide a computer program product or a computer program. The computer program product or the computer program includes computer instructions stored in a computer-readable storage medium. A processor of a computer device reads the computer instructions from the computer-readable storage medium. The processor executes the computer instructions so that the computer device executes the multimedia content sharing method according to any one of the foregoing embodiments.

What is claimed is:

1. A multimedia content sharing method, executed by a computer device, the method comprising:
 displaying a target video;
 receiving, from a server, video information of the target video, the video information of the target video including line timestamp information, first clip line content, and character information, the line timestamp information indicating timestamp information corresponding to the first clip line content, the line timestamp information having been obtained based on a timestamp generation model, the timestamp generation model generating the timestamp information based on vocal audio data corresponding to the target video and unprocessed line information corresponding to the target video, the character information indicating a character corresponding to the first clip line content, the character information having been obtained based on a voiceprint recognition model;
 receiving a clip selection operation on the target video, the clip selection operation being configured to select a target video clip in the target video; and generating, based on the clip selection operation, a multimedia sharing image corresponding to the target video clip, the multimedia sharing image representing sharing information about at least one of a clip picture, a clip line content, and a clip audio of the target video clip.

2. The method according to claim 1, further comprising:
 displaying the multimedia sharing image; or,
 playing the clip audio, the clip audio expressing the clip line content in a form of an audio.

3. The method according to claim 2, wherein the multimedia sharing image comprises the first graphic identification code; and
 the method further comprises:
 receiving a scanning operation on the first graphic identification code in the multimedia sharing image; and
 skipping to the target video clip based on the scanning operation, to play the clip audio.

4. The method according to claim 2, wherein the multimedia sharing image comprises the clip line content; and
 the method further comprises:
 displaying first character information in the multimedia sharing image, wherein the first character information matches the clip line content.

5. The method according to claim 2, wherein the multimedia sharing image comprises the clip line content; and
 the method further comprises:
 displaying a specified range of line contents comprising the clip line content in the multimedia sharing image, wherein the clip line content is highlighted.

6. The method according to claim 1, wherein the multimedia sharing image comprises at least one of:
 the clip line content; and
 a first graphic identification code, the first graphic identification code being scanned and positioned to the target video clip in a playback interface.

7. The method according to claim 1, further comprising:
 receiving a save operation; and saving at least one of the clip line content and the clip audio based on the save operation; or,
 receiving a first sharing operation; and transmitting the multimedia sharing image to an associated account based on the first sharing operation, the associated account being an account that has an association relationship with a target account currently logged in to a terminal; or,
 receiving a second sharing operation; and transmitting the clip audio to an associated account in the form of an audio file based on the second sharing operation.

8. The method according to claim 1, further comprising:
 displaying a content save option and an audio save option in response to the save operation, the content save option being configured to initiate saving of the clip line content, and the audio save option being configured to initiate saving of the clip audio; and
 saving the multimedia sharing image in response to the content save option being selected; and saving the clip audio in response to the audio save option being selected.

9. The method according to claim 1, further comprising:
 displaying at least one candidate sharing platform in response to the first sharing operation, the candidate sharing platform being a preset platform associated with a playback platform of the current target video;
 determining an associated account from a specified platform based on a selection operation on the specified platform in the at least one candidate sharing platform, the associated account being an account that has an association relationship with a target account currently logged in on the computer device; and transmitting the multimedia sharing image to the associated account.

10. The method according to claim 9, wherein the transmitting the multimedia sharing image to the associated account comprises:

transmitting a multimedia sharing link to the associated account, wherein an image display interface corresponding to the multimedia sharing link comprises the multimedia sharing image, and the image display interface takes the clip audio as a background audio.

11. The method according to claim 1, wherein the receiving a clip selection operation on the target video comprises:

receiving a statement selection operation on a line content of the target video as the clip selection operation, the statement selection operation being configured to select at least one line statement; and determining a video clip corresponding to the at least one line statement as the target video clip.

12. The method according to claim 11, wherein the receiving a clip selection operation on the target video comprises:

receiving a long-press operation on the line content of the target video;

displaying a line selection interface based on the long-press operation, the line selection interface comprising a line statement in the line content; and receiving a selection operation on the at least one line statement in the line selection interface.

13. The method according to claim 1, wherein the receiving a clip selection operation on the target video comprises:

receiving a first trigger operation on a timeline of the target video, the first trigger operation being configured to determine a start timestamp of the target video clip;

receiving a second trigger operation on the timeline of the target video, the second trigger operation being configured to determine a termination timestamp of the target video clip; and determining the target video clip based on the start timestamp and the termination timestamp.

14. The method according to claim 1, wherein the receiving a clip selection operation on the target video comprises:

receiving a framing operation on a timeline of the target video as the clip selection operation; and determining, based on a time period corresponding to the framing operation on the timeline, a video within the time period as the video clip.

15. The method according to claim 1, wherein the multimedia sharing image comprises a cover image; and the method further comprises:

taking a cover image corresponding to the target video as the cover image in the multimedia sharing image; or, taking an image captured from the target video as the cover image in the multimedia sharing image; or taking an image captured from the target video clip as the cover image in the multimedia sharing image.

16. The method of claim 1, wherein the voiceprint recognition model is pre-trained based on character audio in a training set.

17. A multimedia content sharing apparatus, comprising:

at least one processor and at least one memory, the at least one memory storing at least one instruction, at least one program, and a code set or an instruction set, and the at least one instruction, the at least one program, and the code set or the instruction set being loaded and executed by the at least one processor to implement:

displaying a target video;

receiving, from a server, video information of the target video, the video information of the target video including line timestamp information, first clip line content, and character information, the line timestamp information indicating timestamp information corresponding to the first clip line content, the line timestamp information having been obtained based on a timestamp generation model, the timestamp generation model generating the timestamp information based on vocal audio data corresponding to the target video and unprocessed line information corresponding to the target video, the character information indicating a character corresponding to the first clip line content, the character information having been obtained based on a voiceprint recognition model;

receiving a clip selection operation on the target video, the clip selection operation being configured to select a target video clip in the target video; and generating, based on the clip selection operation, a multimedia sharing image corresponding to the target video clip, the multimedia sharing image representing sharing information about at least one of a clip picture, a clip line content, and a clip audio of the target video clip.

18. The apparatus according to claim 17, wherein the at least one processor is further configured to perform:

displaying the multimedia sharing image; or, playing the clip audio, the clip audio expressing the clip line content in a form of an audio.

19. The apparatus according to claim 17, wherein the multimedia sharing image comprises at least one of:

the clip line content; and a first graphic identification code, the first graphic identification code being scanned and positioned to the target video clip in a playback interface.

20. A non-transitory computer-readable storage medium having at least one instruction, at least one program, and a code set or an instruction set stored therein, the at least one instruction, the at least one program, and the code set or the instruction set being loaded and executed by at least one processor to implement:

displaying a target video;

receiving, from a server, video information of the target video, the video information of the target video including line timestamp information, first clip line content, and character information, the line timestamp information indicating timestamp information corresponding to the first clip line content, the line timestamp information having been obtained based on a timestamp generation model, the timestamp generation model generating the timestamp information based on vocal audio data corresponding to the target video and unprocessed line information corresponding to the target video, the character information indicating a character corresponding to the first clip line content, the character information having been obtained based on a voiceprint recognition model;

receiving a clip selection operation on the target video, the clip selection operation being configured to select a target video clip in the target video; and generating, based on the clip selection operation, a multimedia sharing image corresponding to the target video clip, the multimedia sharing image representing sharing information about at least one of a clip picture, a clip line content, and a clip audio of the target video clip.

* * * * *